April 7, 1970 R. MARIE 3,504,754
VEHICLE SPEED CONTROL DEVICE
Filed Oct. 17, 1967 8 Sheets-Sheet 1

INVENTOR.
ROBERT MARIE
BY
ATTORNEYS

April 7, 1970 R. MARIE 3,504,754
VEHICLE SPEED CONTROL DEVICE
Filed Oct. 17, 1967 8 Sheets-Sheet 4

INVENTOR.
ROBERT MARIE
BY
ATTORNEYS

INVENTOR.
ROBERT MARIE

INVENTOR.
ROBERT MARIE

INVENTOR.
ROBERT MARIE

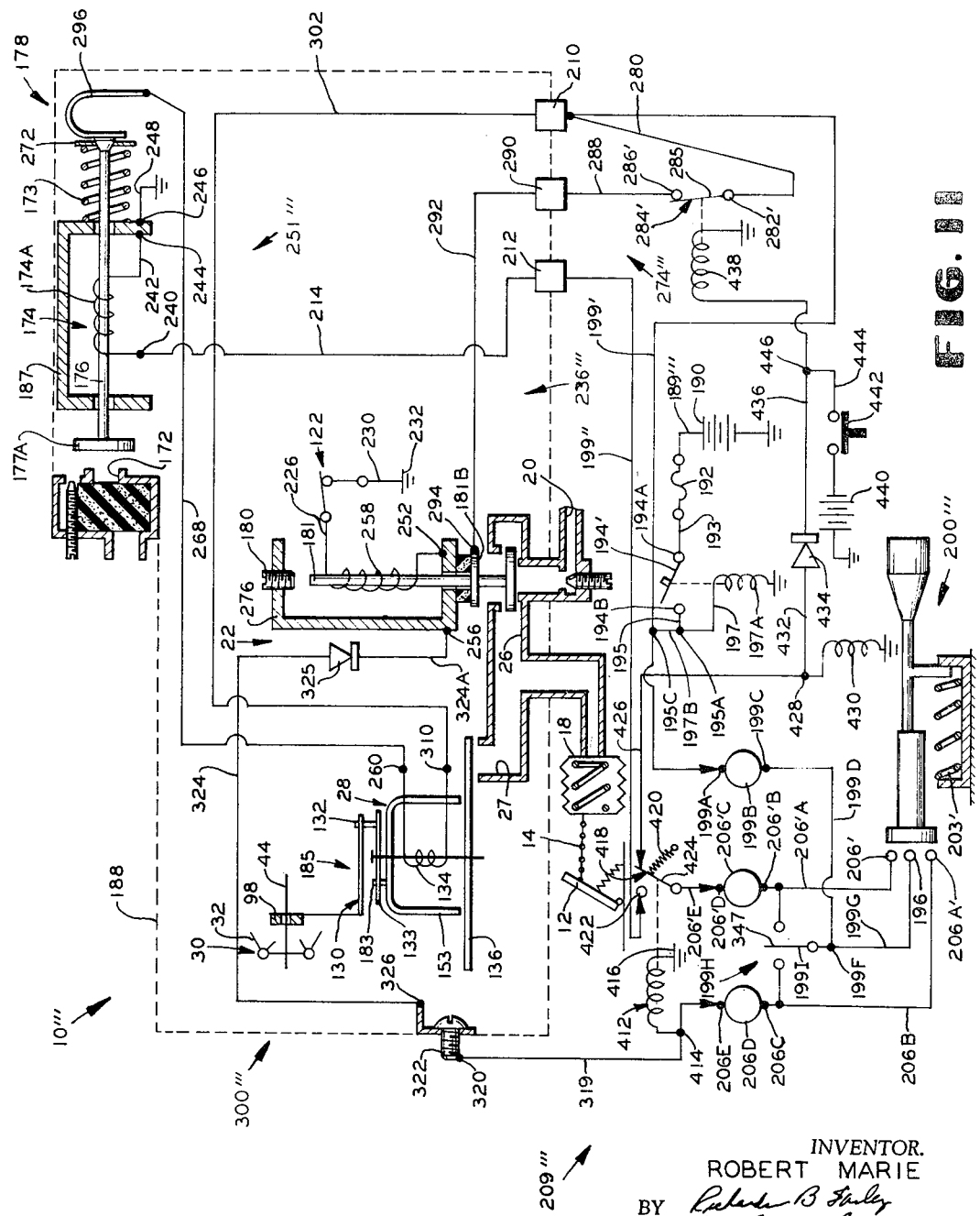

United States Patent Office 3,504,754
Patented Apr. 7, 1970

3,504,754
VEHICLE SPEED CONTROL DEVICE
Robert Marie, Hagerstown, Ind., assignor to Dana Corporation, Toledo, Ohio, a corporation of Virginia
Continuation-in-part of application Ser. No. 528,624, Sept. 28, 1966, now Patent No. 3,410,361. This application Oct. 17, 1967, Ser. No. 675,918
Int. Cl. B60k *33/00*
U.S. Cl. 180—108    22 Claims

ABSTRACT OF THE DISCLOSURE

An electro-mechanical device for speed regulation for an automotive vehicle which utilizes manifold vacuum modulated by atmospheric pressure to control the engine throttle and thereby maintain the vehicle at a desired speed is provided. A regulator means senses the actual speed of the vehicle and feeds vacuum pressure modulated by atmospheric pressure to a servo means which controls the throttle setting. An electrical circuit includes means for actuating the regulating means to lock the vehicle at the desired speed and also includes means to actuate the regulator means to advance the speed of the vehicle. Additional means are also provided in the form of a holding circuit arrangement which insures that the speed regulator has a "memory" so that after braking or throttle pedal acceleration the vehicle will again automatically assume the preselected speed.

---

Figure 1:
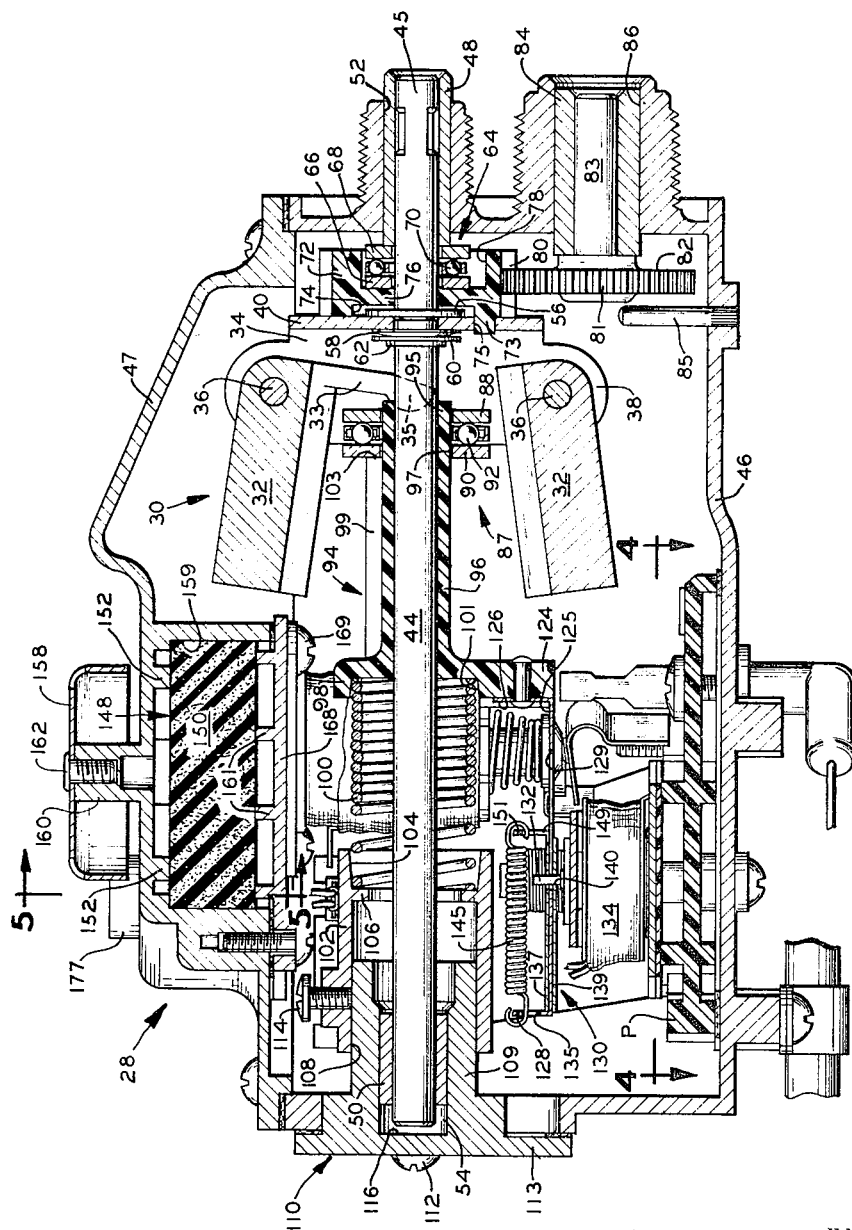

This application is a continuation-in-part of my co-pending patent application Ser. No. 528,624, filed Sept. 28, 1966 and entitled "Vehicle Speed Control Device" now Patent No. 3,410,361.

This invention relates generally to speed control devices and more particularly to an improved speed control device having automatic and closely controlled return to a set vehicle speed after manual acceleration or braking of the vehicle by its operator. Although prior speed control devices have been designed which utilize fluidic means for controlling the throttle setting of the vehicle and thereby its speed and these same speed control devices have also included means for resuming a particular speed, after deceleration or acceleration, no such prior art devices are known which resume set speed after both manual acceleration and braking and yet also resume this set speed over an extremely wide range of sensitivity limited only by the top speed of the vehicle and the speed control disabling position set by the low speed switch of the regulator (generally 25 m.p.h.). Furthermore, no speed control device is known which accomplishes this function and additionally accomplishes the function of manual speed set and speed advance utilizing a simplified vacuum and electrical control circuit which is compact, reliable, easily assembled and low in cost.

It is, therefore, an object of this invention to provide a speed control device having automatic return or resume to a preset speed after acceleration or deceleration of the vehicle.

It is an additional object of the invention to provide a speed control device having speed resume to a preselected speed over a wide speed range varying therefrom.

It is a further object of the invention to provide a speed control device having a manual speed set, speed advance and speed resume.

It is a still further object of this invention to provide a speed control device for manual speed set, speed advance, speed resume and manual speed retard.

It is still a further object of this invention to provide a speed control device which is durable in operation, easily and inexpensively manufactured.

In one embodiment of the invention an electro-magnetic device is provided that utilizes manifold vacuum as modulated by atmospheric pressure to control the engine throttle setting and thereby maintain the vehicle at a desired speed. In common with my co-pending patent application mentioned above, the three basic components of the device are a regulator means, a servo means and an electric circuit and control switch. The regulator means senses speed through a speedometer cable or cable attached to the transmisison or the like and feeds vacuum pressure modulated by atmospheric pressure to the servo means which controls the throttle setting. The regulator means includes a solenoid valve means that opens or closes to permit the application of vacuum pressure to the servo which, in the instant device, takes the form of a bellows. The modulating valve is also supplied as a portion of the regulator means, this valve controlling the bleed of atmospheric pressure to the servo means, with the modulating valve adjusted by a coupling coil to a flyball governor that senses vehicle speed. The electrical circuit includes means for actuating the solenoid valve and coupling coil so that the speed control device can be locked in at the desired control speed and also includes means provided in the form of a second solenoid valve capable of closing off the atmospheric air supply to provide full vacuum to the servo bellows to rapidly advance the throttle and thereby the speed of the vehicle. Additional means are also provided in the form of a holding circuit for the coupling coil and an additional lost motion connection between the flyball governor and modulating valve so that the modulating valve may be locked in and provided with a "memory" of a preselected speed to enable the controlled vehicle to automatically resume the preselected speed after manual acceleration or braking of the vehicle by the operator.

In another embodiment of the invention a similar arrangement as described above is utilized but a relay switching means is provided in the electrical circuitry with the coupling coil placed in actuated holding position (speed resume position) by movement of the relay switch of the vehicle to an on position.

In a third embodiment of the invention a retard means is added generally to the circuitry of the combined manual speed set, advance and resume device of the first embodiment of the invention to provide a pushbutton actuated means for deceleration of the vehicle.

In a fourth embodiment of the invention is illustrated a system having manual speed set, advance, resume and retard features, the said system being adapted for the placing of the manual actuating means therefor on the steering ring or wheel of the vehicle.

Figure 2:
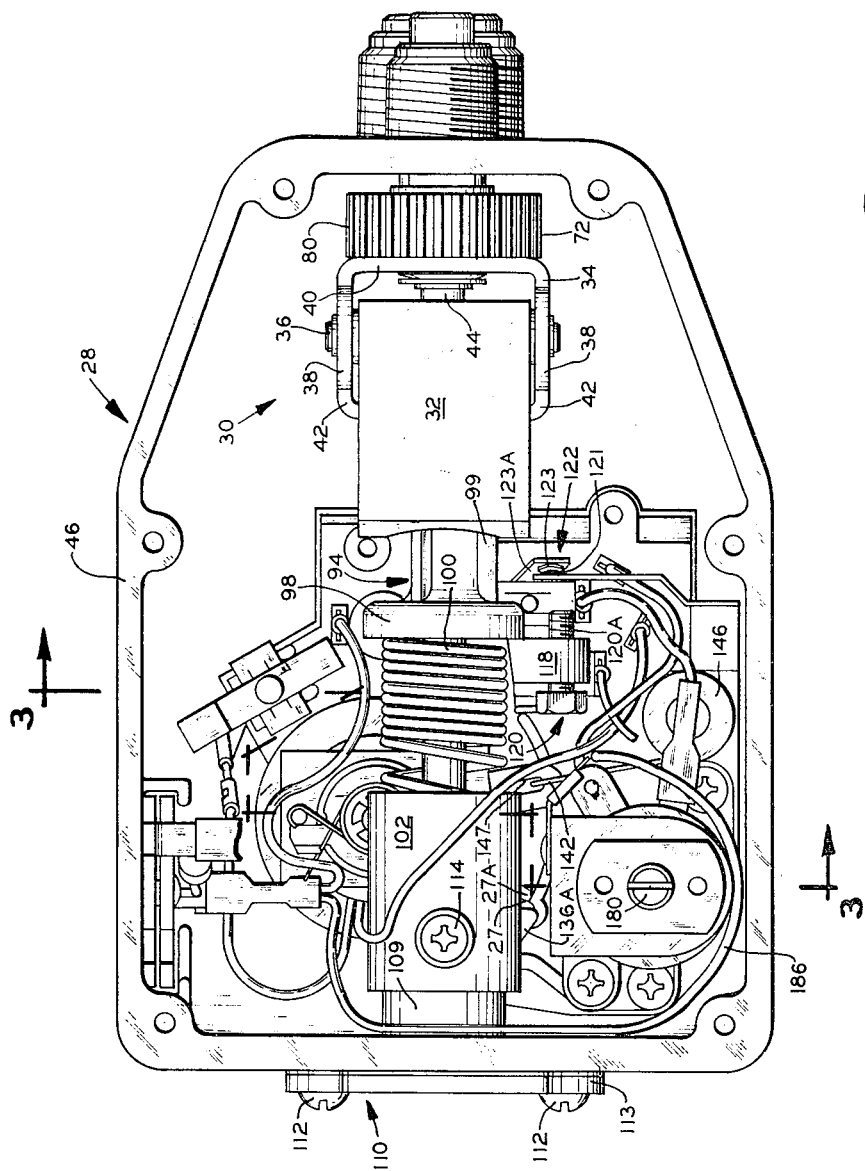
Figure 3:
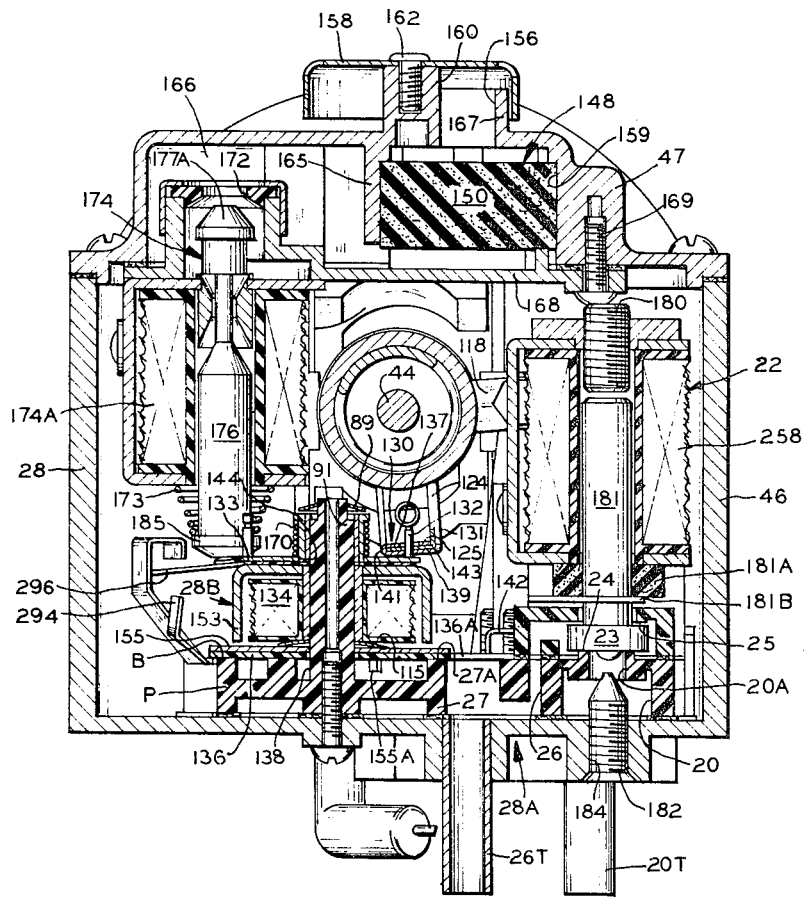
Figure 4:
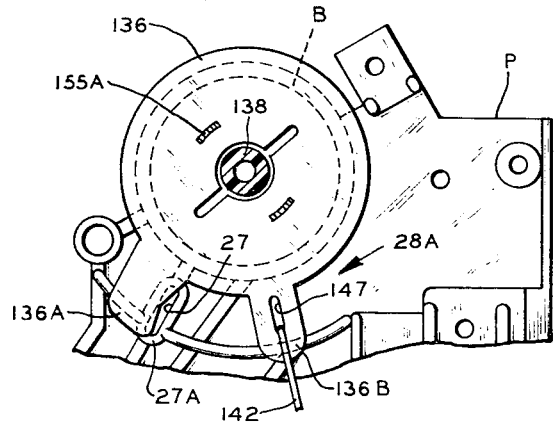
Figure 5:
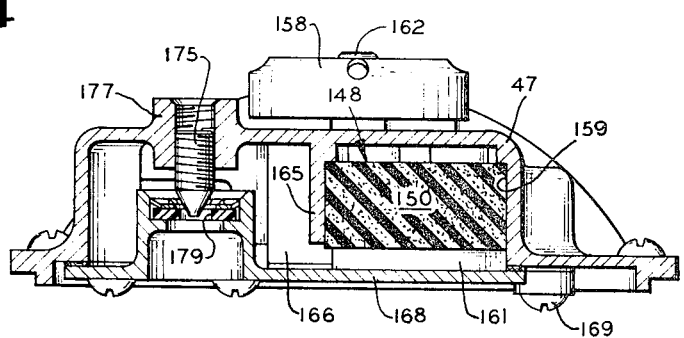
Figure 6:
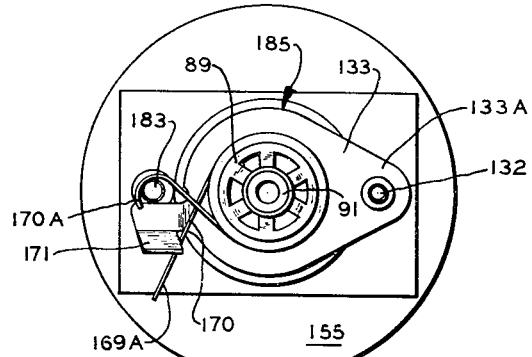
Figure 7:
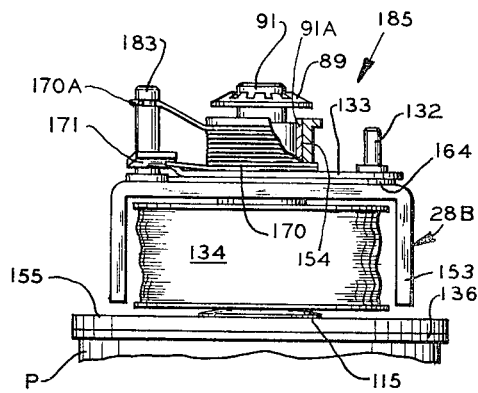
Figure 8:
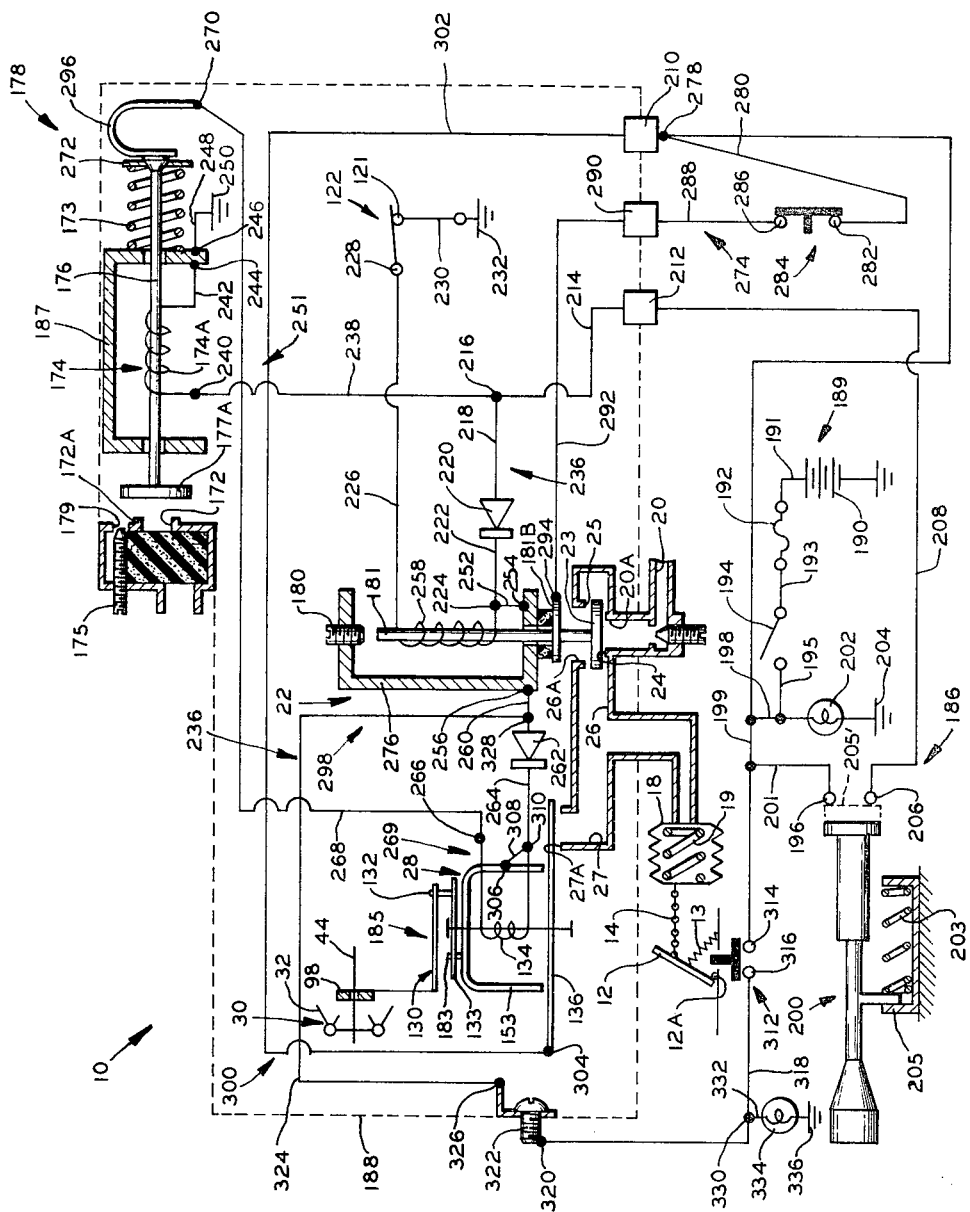
Figure 9:
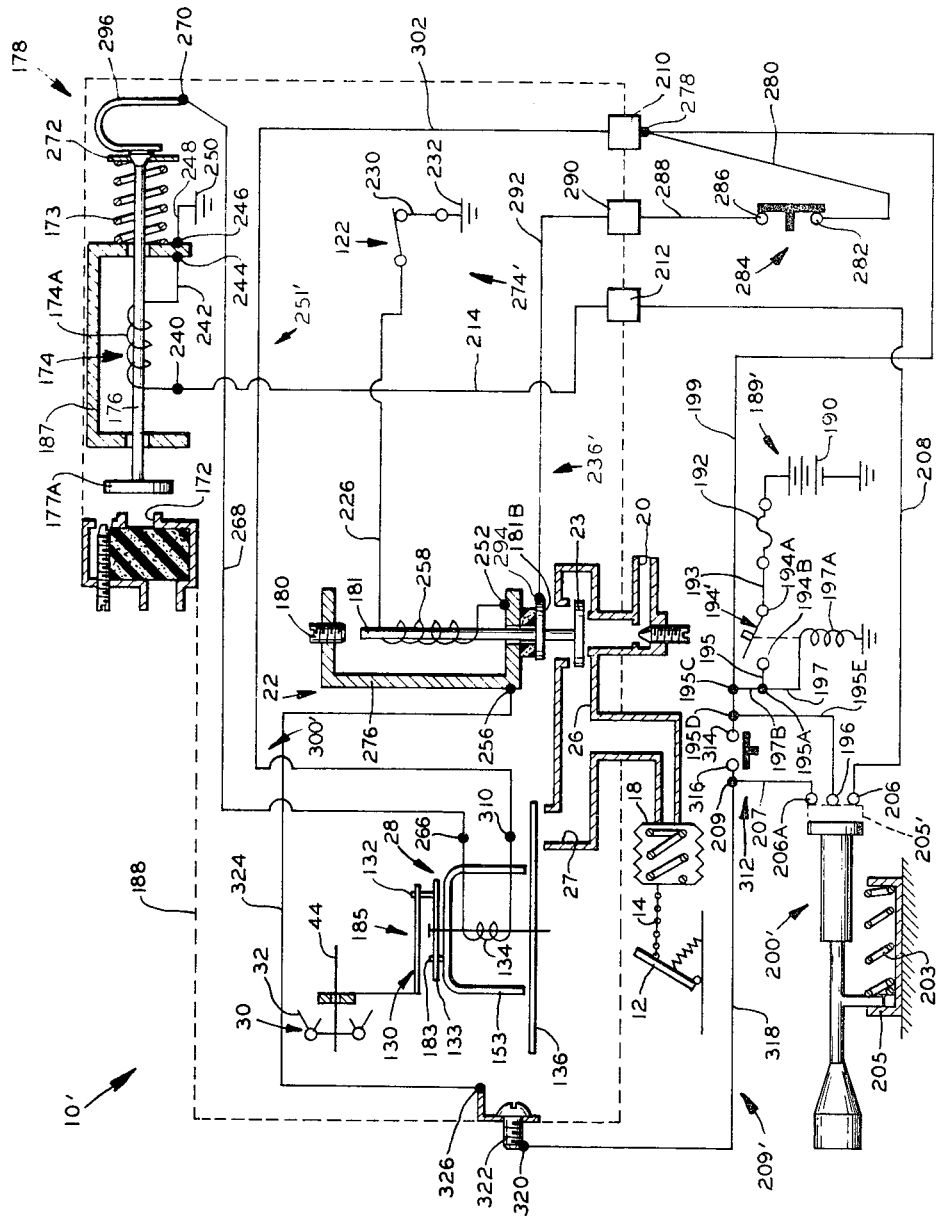
Figure 10:
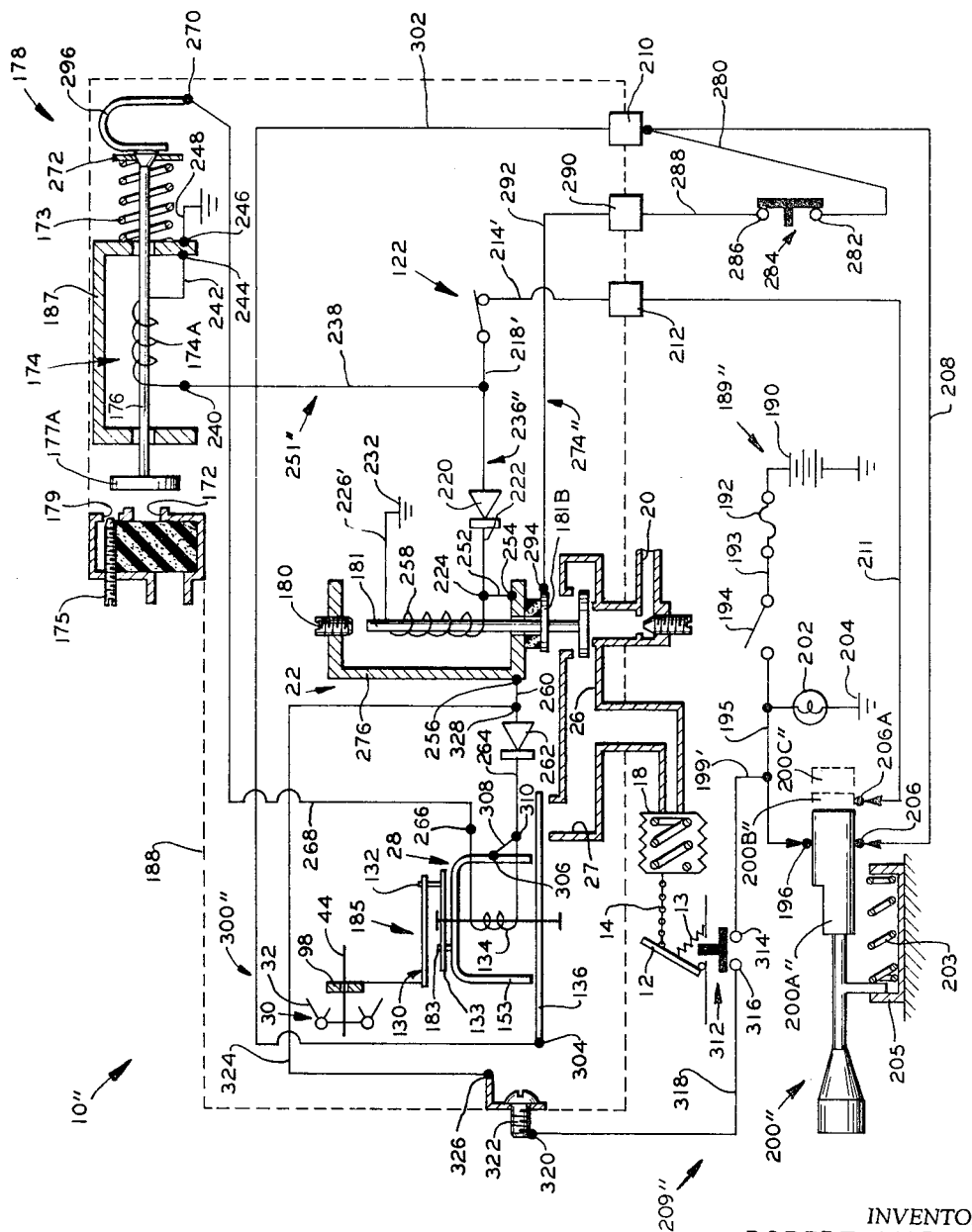

Other objects and advantages of the invention will be made more apparent from a reading of the following description and a consideration of the related drawings wherein:

FIG. 1 is a side view in cross-section of the speed regulator,

FIG. 2 is a plan view of the regulator of FIG. 1 with the housing cover removed, FIG. 3 is a cross-sectional view of the regulator shown in FIG. 1 when viewed generally on line 3—3 of FIG. 2, FIG. 4 is a fragmentary plan view of the modulated drive when viewed generally along line 4—4 in FIG. 1, FIG. 5 is a cross-sectional view of the speed regulator when viewed along the line 5—5 of FIG. 1 and shown in the lead valve arrangement, FIG. 6 is a plan view of the torsion spring connection and pin arrangement of the additional lost motion connection for the coupling valve, FIG. 7 is an elevational view of the additional lost motion connection of the modulating valve taken on line 7—7 of FIG. 6, FIG. 8 is a schematic illustration of the speed control system incorporating the regulator of FIG. 1 with certain parts fragmentarily shown and certain parts in section, FIG. 9 is a schematic illustration similar to FIG. 8 but showing a speed control device having a resume position which is actuated by positioning of an on relay switch of the speed regulator, FIG. 10 is a schematic illustration similar to FIG. 8 of a speed control device having a modulated retard in addition to manual speed set, advance and resume, and FIG. 11 is a schematic illustration similar to FIG. 10 of a speed control device in which the control buttons therefor may be mounted on the steering ring.

A speed regulator system 10, embodying the instant invention, is schematically illustrated in FIG. 8, and is preferably installed in a vehicle to control the engine through a throttle lever 12 and any suitable one-way linkage, such as a bead chain 14, connecting the throttle lever 12 to a servo motor in the form of a bellows 18 of the speed regulator system 10. The lever 12 is mounted at its lower end on a pivot 12A and connected by suitable linkage to the carburetor of the engine (not shown) such that clockwise movement of the lever advances the carburetor setting while counterclockwise movement thereof retards such setting; the throttle lever being biased counterclockwise by a spring 13 to its maximum retard or idle position. The chain 14, upon collapse of the bellows 18, pulls the lever 12 advancingly clockwise against the bias of the spring 13, while the lever, because of the one-way effect of the chain, may advance clockwise beyond the position dictated by the bellows in response to other forces, such as the operator of the vehicle manipulating the gas pedal.

A supply line 20 is adapted to be connected to a suitable fluidic source. In the embodiments shown herein the fluidic source is contemplated as being a supply of negative pressure such as the intake manifold of an internal combustion engine (not shown) and the components of the system 10 are adapted for vacuum utilization; it being understood that other fluidic types can be utilized with suitable modification of the components of the system 10. A second supply line 26 is connected to the supply line 20 at a port 20A, with the supply line 26 confluently connected to the bellows 18. Thus, upon vacuum being supplied to the bellows 18 through the supply lines 20 and 26, the bellows will collapse thereby pulling the chain 14 to the right.

The supply line 26 is provided with a port 26A aligned with the port 20A, which port 26A is adapted to admit atmospheric pressure to the line 26. The ports 20A and 26A are respectively provided with valve seats 24 and 25 and a plunger 23 of a solenoid valve 22 is disposed in the supply line 26 and adapted to move alternately to positions wherein it engages the seat 24 or the seat 25. When the plunger 23 engages the seat 25, vacuum or negative pressure is supplied from the supply line 20 through the port 20A and to the supply line 26 and, through the latter, to the bellows 18; the plunger 23 being seated upon the valve seat 25 and preventing the admission of atmospheric pressure through the port 26A to the supply line 26 at this time. When the plunger is seated against the valve seat 24, negative pressure in the line 20 is blocked from the line 26 and, since the port 26A is open at this time, atmospheric pressure is supplied therethrough to the line 26 and through the latter to the bellows 18. The bellows 18 may be provided with a return spring 19 which returns the bellows to its expanded condition upon the supply thereto of atmospheric pressure, so that the bellows no longer pulls the bead chain 14 to the right. Alternately, the spring 19 may be omitted and the spring 13 utilized to expand the bellows by means of the connection of the spring 13 with the bellows through the lever 12 and chain 14.

The supply line 26 is provided with a port 27 which is adapted to bleed air from the atmosphere into the supply line 26, and a regulator means 28 is adapted to modulatingly control the flow of air from the atmosphere into the supply line 26 through the port 27. The regulator means 28, when activated, is responsive to vehicle velocity in modulating the supply of atmospheric pressure to the supply line 26 to thereby maintain the bellows 18 and the lever 12 in proper position for desired speed maintenance.

The regulator means 28 (FIGS. 1–4) includes a flyball governor 30 including a pair of opposed weights 32, 32 with each of the weights having an arm 33 extending inwardly from a corner thereof to give each of the weights and attached arm a general L-shape in side view. Each of the weights 32 is attached to a collar bracket 34 by a pivot pin 36 mounted in the collar bracket. The collar bracket is generally U-shaped in configuration (FIG. 2) with each of the spacedly displaced legs 38 of the collar bracket mounting the pivot pins 36 so that the pins extend therebetween, with the pivot pins 36 spaced sufficiently far from a bight 40 of the collar bracket 34 so that the weights 32, 32 mounted thereon are free to pivot inwardly beyond an axially parallel position before there is engaging interference of the arm 33 of the weight with the bight 40 of the collar bracket. The collar bracket 34 also includes radially inturned portions 42 at the outer ends of the legs 38 which, by engaging the arm 33, limit outward pivoting movement of the weights 32.

The governor 30 includes a shaft 44 on which is mounted the bracket 34 and which extends longitudinally within a regulator housing 46, with the shaft 44 journalled therein by a pair of bushings 48 and 50 disposed at its opposite ends. The bushings 48 and 50, in turn, are fixedly disposed in the housing by being press-fit in a pair of bores 52, 54 formed, respectively, in the housing 46 and an end cap 110 fixed thereto.

Provision is made to fixedly connect the collar bracket 34 to the shaft 44 so that there is no relative rotational or longitudinal movement therebetween which includes a washer 56 locked to the shaft and disposed against the rightward face of the bight portion 40 of collar bracket 34 and a Belleville washer 58 disposed against the leftward face of the bight portion 40 and held thereagainst by a spacer washer 60 and washer 62 locked to the shaft. It should be noted that the shaft 44 and thereby the flyball governor 30 will be urged to move by reaction forces axially rightward relative to the housing 46 so that a thrust bearing means 64 comprising a pair of spacer washers 66, 68 disposed on opposite sides of a bearing ring 70 are provided so as to permit the flyball governor to easily rotate with the shaft 44 without the imposition of large friction forces.

The thrust bearing means 64 is mounted within a gear 72 which may preferably be made of plastic such as nylon or the like since only small loads are transmitted thereby. A counterbore 78 in the gear 72 receives the bearing means 64. The axial extent of the bore 78 is less than the combined linear dimensions of the spacer washers 66, 68 and the bearing ring 70 so that the rightward washer 68, upon rightward axial shifting of the shaft 44 abuttingly bears against the bushing 48 so that the side face of gear 72 is not subject to rubbing contact with the housing 46 or bushing 48. The gear 72 is provided with a counterbore 74 in its leftward portion to receive the retaining washer 56, with the bore 74 spaced from the bore 78 by an annular web 76 that seats against the washer 66.

Extending leftwardly from the gear 72 is a tang 73 which engages in an aperture 75 in the collar bracket 34 to insure that there is no relative rotation between them so that they rotate unitarily with the shaft 44, the shaft 44 at its rightward end 45 providing a suitable connection for a speedometer cable (not shown).

Teeth 80, formed on the external periphery of gear 72, are in meshing contact with teeth 81 on a gear 82 which may also preferably be made from a similar material as that utilized for gear 72. Gear 82 is fixedly mounted on a shaft 83 with the shaft 83 and gear 82 being limited in leftward axial movement by a pin 85 fixed to the housing 46. A bushing 84 press-fit in a bore 86 in the housing 46 supports the gear 82 and shaft 83 for rotational movement, the said movement being imparted to a cable or the like extending from the vehicular speedometer (not shown). Thus it can be easily seen that the shaft 83 provides a driven shaft and the shaft 44 the driving shaft for the speed regulator.

Disposed immediately leftwardly of the arms 33 on the weights 32 and mounted on the shaft 44 is a thrust bearing means 87 including a pair of spacer washers 88 and 90 between which is disposed a bearing ring 92. A spring guiding retainer 94, also preferably made of plastic, having a generally axially rightwardly extending hollow cylindrical portion 96 is also mounted around the shaft 44 and extends into the bore 97 of the spacer washers 88, 90 and bearing ring 92 to provide a mounting and alignment portion 95 for the thrust bearing means 87; the shaft 44 being freely rotatable within the retainer.

A series of radially outwardly extending ribs 99, integral with the spring guiding retainer 94, extend leftwardly from the mounting and alignment portion 95 with the said ribs extending axially along the remainder of the cylindrical portion 96 to serve as a strengthening means for the spring retaining cup. The rightward termination of the ribs 99 provide faces 103 against which the thrust bearing means 87 abuts. The rightward spacer washer 88 of the thrust bearing means abuts against a slightly rounded end 35 on each of the weight arms 33 so that, as the weights 32 pivot outwardly due to centrifugal force, the spring guiding retainer 94 is shifted axially leftwardly along the shaft 44 with the shaft attached weights 32 free to rotate relative to the spring guiding retainer 94 on bearing means 87. It should be understood that the arms 33 are displaced in a radial direction sufficiently removed from the shaft 44 so that no engagement occurs between the rightward end of the mounting and alignment portion 95 and the rounded end 35 of the arms.

The leftward end of the spring guiding retainer 94 includes a flared, hollowed out portion 98 forming a cuplike pocket 101 into which a resilient means 100 extends and seats. The resilient means 100 surrounds the shaft 44 and preferably takes the form of an axially extending coiled compression spring with the internal diameter thereof being sufficiently large so that coils of the spring do not interfere with rotation of the shaft 44. At the leftward end of the housing 46 a spring retaining collar 102 is mounted, the collar 102 being of generally hollow cylindrical shape so that the shaft 44 may extend therethrough. A tapered counterbore 104 in the retaining collar 102 receives the leftwardly extending end of the resilient means 100, this end of the resilient means seating on an annular flange 106 formed in the collar 102.

At the opposite end of the collar 102, a bore 108 is provided so as to receive a cylindrical shaped portion 109 of the end cap 110. A set screw 114 is threadingly received in retaining collar 102 and impinges on the portion 109 of the end cap to thereby fix the collar relative to the end cap. A plurality of screws 112 secure an end flange 113 of the cap portion 110 to the housing 46 so that the cap portion is fixed relative thereto and an inner end face 116 on the cap portion provides an abutting surface to limit axial shifting of the shaft 44 in a leftward direction.

Formed as an integral part of the spring guiding retainer 94 is a radially outwardly extending lug 118 (FIGS. 2 and 3) utilized as a convenient attachment for the means that actuates a low speed switch 122 which is mounted in fixed relation in the housing 46. An adjustment screw 120 is screwingly mounted in the lug 118 with its threaded shank portion 120A extending through the lug. The amount that the shank portion 120A extends to the right of the lug may be screwingly adjusted so as to control the position of the end of the screw 120 (as controlled by the speed responsive position of the governor weights 32) relative to the low speed switch 122 and the low speed setting may be accurately adjusted. The switch 122 includes a stationary contact 121 and a movable contact 123 carried by a leaf spring 123A; the contact 121 and leaf spring 123A being insulatingly carried by the housing 46. It should be understood that the switch 122 is a normally closed limit switch which is held open by the screw 120 at speeds below the adjusted low speed, that is, below the adjusted low speed the screw 120 is in engagement with the leaf spring 123A and biases the upper portion of the same to the right to space the contact 123 to the right of the contact 121, and that leftward shifting of the spring retaining cup 94 moves the screw 120 to the left and away from contact with the resilient leaf spring 123A when speed above the adjusted low speed is reached and permits the spring 123A to bring the contact 123 into engagement with contact 121 and thereby close the switch 122. The adjustment screw 120 may be set to permit closing of switch 122 at any desired speed but normally a vehicle speed of 25-30 miles per hour is considered most desirable.

An attaching lug 124 (FIGS. 1 and 3) is also formed as a part of the spring guiding retainer 94 and is displaced 90° from the lug 118 and extends radially downwardly from the flanged portion 98. A link 125 is attached to the lug 124 through an integral right angled portion 126 on the link by riveting or the like, and the link 125 extends axially leftwardly and parallel to shaft 44 so that the link moves axially with the spring guiding retainer 94. A slot 129, disposed in the link 125, extends linearly in the axial direction along the link 125 for the reception of a pin 132 extending therein so that the pin 132 may slide relative to the length of the link 125. A slider member 130, mounted on the link 125, also receives the pin 132 through an aperture 140 disposed therein. Slider member 130 is generally U-shaped in cross-section with two extending legs 137 and 139 disposed against opposite upper and lower faces of the link 125 and the bight portion 141 of the slider member is disposed against the edge of the link 125. Slider member 130 also includes an upturned portion 143 formed on the lower leg 139 which slightly overlaps an upturned angled portion 131 extending linearly in an axial direction along the link 125. The pin 132 is thereby mounted in and guided in its sliding movement along link 125 by the slider member 130.

The link 125 also includes, at its leftward end, another right angled portion 128 having a slot 135 disposed therein for connection to the end of a coiled tension spring 145. The spring 145 is conveniently hooked through slot 135 and extends rightwardly therefrom and is hooked at its opposite end through a similar slot 149 disposed in a right angled portion 151 on the slider member 130. The spring 145 thereby urges the slider member 130 and the upwardly extending pin 132 leftwardly with it, this leftward movement being limited by the abutment of the leg 137 of the slider member with the right angled portion 128 of the link 125. Accordingly, the spring 145 yieldingly connects the link 125 to the pin 132 and allows the link to leftwardly overtravel the pin 132 if required for manual override by the accelerator pedal.

The regulator means 28 also includes a modulating valve means shown generally at 28A and a controllable coupling means shown generally at 28B, the latter being provided for coupling the flyball governor 30 to the modulating valve means. More particularly, a plastic housing P is suitably secured, as by a plurality of bolts, to the inside of the bottom wall of the housing 46, adjacent the left end thereof as seen in FIG. 1. As viewed in FIG. 3, in the right-hand portion of the plastic housing P are formed portions of the supply lines 20 and 26, while other portions of the supply lines, respectively, are provided in tubes 20T and 26T pressed into the housing 46 and confluent with the portions of the supply lines in the plastic portion. The port 27, which is adapted to bleed modulating atmospheric pressure into the line 26, is provided with a valve seat 27A and, to the left of the valve seat, the plastic housing has formed thereon an annular shoulder, the upper surface thereof forming a bearing surface B upon which rests a valve plate 136; the latter being hereinafter more fully described. Projecting upwardly from the housing P and formed integrally therewith is a pivot post 138 disposed centrally with respect to the bearing surface B.

The coupling means 28B includes a metallic bracket 153 having a general U-shaped cross-section when viewed in FIG. 3, which bracket has centrally fixed secured thereto a downwardly extending cylindrical bushing 91 pivotally received on the post 138. Insofar as described the related structure is exactly the same as the structure of the device described in my aforementioned co-pending patent application. Pin 132 in the instant application is fixedly attached in an upstanding eccentric relation to a Teflon coated plate 133 on a tab 133A integral therewith, the plate 133 having a generally centrally located bore 144 so as to be rotatable relative to a bracket 153. A shouldered bushing 91 fixed and extending through the bracket 153 provides a center of rotation for the Teflon coated plate 133 to rotate in a horizontal plane. Disposed between the bracket 153 and the Teflon plate 133 is a washer 164 made from nylon, mylar or the like which spaces the bracket 153 so as to make the plate 133 easily rotatable relative to the confronting portion of the bracket 153. A torsion spring 170 mounted on bushing 91 above plate 133 is furnished to urge a bent tang member 171 integral with plate 133 into engagement with a pin 183 fixedly attached and extending upwardly from the bracket 153. In order to urge the Teflon coated plate 133 clockwise to this position, as required, a straight end 169A of torsion spring 170 engages the tang 171 by being urged thereagainst by its inherent compressed resiliency while a curved, hooked portion 170A of the torsion spring 170 engages the upstanding pin rigid with the bracket 153. By the just described structure a lost motion connection 185 is attained between the bracket 153 and linkage 130 to permit deceleration of the vehicle without significant movement of the bracket 153, i.e., the plate 133 is free to swing clockwise from its rightward abutment with the upstanding pin nearly 360° until it abuts this upstanding pin on its leftward periphery before movement of the pin 132 would be required.

A bushing 91A surrounds the pivot post 138 and is disposed abuttingly above the bracket 153 and has a Teflon coated surface 154 to provide a bearing surface for the Teflon coated plate 133. A washer 89 secured to the uper end of the post 138 is abutable with the bushing 91A to inhibit upward movement of the bracket 153. Mounted intermediate the bracket 153 and the valve plate 136 is a thin metallic plate 155, which plate is secured to the valve plate 136 by lug means 155A formed on the metallic plate and projecting through registering openings in the valve plate. The valve plate is preferably formed from plastic that is freely slidable on the bearing surface B. A relatively weak Belleville spring washer 115 is disposed between the bushing 91 and the metallic plate 155 with its external periphery engaging the plate and the top surface thereof engaging the bushing 91 to thereby normally resiliently displace the bushing and bracket 153 vertically above the metallic plate 155, whereby the metallic plate 155 and valve plate 136 may rotate as a unit independently of the bracket 153.

A cylindrical coupling coil 134 is rotatably disposed about the pivot post 138 and disposed within the bracket 153. The coupling coil 134, upon being energized, is capable of magnetically locking the metallic bracket 153 and the metallic plate 155 so that upon turning movement of the bracket 153, when the coil is energized, the valve plate 136 will turn unitarily therewith.

A pair of lugs 136A and 136B, best seen in FIG. 4, extend from the valve plate 136. The lug 136A is positioned so as to be cooperative with the valve seat 27A, that is, the bottom surface of the lug 136A is engageable with the valve seat. Upon rotation of the valve plate 136, the lug 136A is operable to slide on the seat 27A and, depending upon the lug's position, covers, uncovers or partially covers the port 27.

An elongated centering spring 142, made of a thin resilient wire has the reaction end thereof connected to a pin 146 (see FIG. 2) fixed relative to the housing, while the opposite end of the spring is bent vertically downwardly and passes through a slot 147 formed in the lug 136B. As seen in FIG. 4, the centering spring 142 is adjusted so that when the coil 134 is not energized, the spring will position the valve plate 136 such that the right side of the lug 136A, which is V-notched, partially overlies the port 27. The V notch is provided so that, upon movement of the lug 136A relative to the port 27, a gradual change in the opening of the port will occur. The exact centralized position of the lug 136A may be adjusted by adjusting the spring 142 and it is prefered that the port 27 be partially open when the coil 134 is not energized. Accordingly, when the coil 134 is energized to couple the governor 30 to the valve plate 136, the modulating means 28A will be in a partial modulating condition, that is, not full on or full off and, thus, only a minor modulating change can occur upon energization of the coil.

A filtering means 148 is disposed in the cover portion 47 of housing 46 (FIGS. 3 and 5) to clean the air flowing into the housing for supplying the valve means 28A with atmospheric pressure. The filtering means 148 comprises a filter element 150, which is a block of foamed polyurethane or the like, mounted in a space 159 formed in cover 47 and sandwiched between two sets of ribs 152 and 161 (FIG. 1). The ribs 152 are integral with the cover and the ribs 161 are integral with a plate member 168 secured to the bottom side of cover 47 by screws 169, so that the ribs serve as a spacing means for the filter element 150 to provide an air space above and below it. A port 156 (FIG. 3) disposed immediately above the filter element 150 and confluent with the space 159 is formed in a boss 167 integral with the housing 46. This port connects directly with the atmosphere and leads down and opens above and centrally relative to the filter element 150 and thus serves as a modulating fluidic source. A generally cup-shaped element 158 is mounted on a boss 160 also formed integral with the housing 46 and is fixed thereto by a screw means 162. The cup-shaped element 158, with its periphery spaced slightly over the cover 47, extends over port 156 and protects the same from the intrusion of dirt into the housing.

After air passes through the filter 150, it flows into a compartment 166 (see FIG. 5) separated from the remainder of the spaced 159 by a wall 165 extending downwardly but not engaging the plate member 168. Within the compartment 166 is a port 172 (FIG. 3) communicating with the inside of the housing 46. An advance solenoid valve 174 is disposed beneath this port so that a conical plunger 177A carried by an armature 176 of the solenoid valve may alternately open and close the port 172. Accordingly, the advance solenoid valve 174 is a part of the regulator means 28.

A bleed adjusting screw 175 (FIG. 5) threadedly mounted in a boss 177 in cover 47 and extending into an orifice 179 in the plate member 168 permits a limited bleeding of air through the compartment 166 and into the housing 46 at all times so that actuation of the advance solenoid valve 174 to the closed position does not completely deprive the housing of its air supply and thereby vary the speed of the vehicle too rapidly, as hereinafter more fully described.

Actuation of the solenoid valve 174 so that it moves upwardly to cover the port 172 operates to open a normally closed limit switch 178 comprised of an armature 176 of the valve 174 and a switch blade 296; the armature being normally biased into engagement with the blade 296 by a spring 173, while the blade is insulatingly carried by the housing 46.

The solenoid valve 22 that controls the flow of vacuum to supply line 26 is provided with an adjustable screw 180 (FIGS. 2 and 3) disposed above it which determines the length of upward travel of the solenoid armature 181 in opening and closing against the valve seat 25. The adjustment screw 180 also serves as a contact point for the flow of electrical current in the control circuitry which will be later described. A restricter element 182, which is mounted in the housing below the solenoid valve 22 (FIG. 3), is disposed in the vacuum supply 20 such that the end thereof cooperates with the port 20A to provide an orifice, and is provided with threads 184 so as to adjust inwardly and outwardly to alternately decrease or increase the flow of negative pressure supplied to solenoid valve 22.

Wiring generally indicated by number 186 is also provided in the housing 46 to electrically connect the various elements already described and to form the control circuitry for the speed regulator system 10, the wiring illustrated being that useable with the second embodiment of the invention.

Referring now to FIG. 8 wherein the entire speed regulator system 10 is shown schematically, the dashed rectangular outline denoted 188 indicates the enclosure formed by the shell of the housing 46 and cover 47 and illustrates, by outlining within its boundaries, the actuating and control elements disposed within the housing.

Conveniently mounted in the vehicle outward of the housing is a power supply circiut 189 that includes a power supply such as a grounded battery 190. A lead 191 attached to the battery 190 extends to a fuse 192 which, in turn, is connected to an on-off switch 194 by a lead 193. A lead 195 attached to the opposite contact of the switch 194 is electrically connected to a contact 196 of a two-position switch 200 through a short branch lead 198 which forms a junction with a long lead 199 which, in turn, is connected to the contact 196 by a lead 201. Lead 195 extends beyond its junction with lead 198 for connection to a signal light 202 that is grounded at 204. This arrangement places the signal light 202 in circuit with the battery 190 so that closing of the switch 194 actuates the signal light 202 to indicate power is available at contact 196 of switch 200. The signal light 202 may, of course, be conveniently located on the dashboard of the vehicle so as to be easily seen by its operator and provide a visual signal indicating that the speed control mechanism is in an on position capable of actuation.

The previously referred to contact 196 is also positioned so that an electrical circuit may be established through it to a contact 206. This current path is established by fully depressing switch 200 to the position indicated 205', shown in dotted lines, against the urging of spring 203 thereby energizing a portion of circuit 186 extending from the switch 200 to the enclosure 188 which will now be described. Contact 206 is connected to a lead 208 which, as the lead 199, is disposed outwardly of the speed regulator enclosure 188. These leads are connected, respectively, to junction points 210 and 212 which may each conveniently take the form of a female connection mounted on the enclosure 188 so that the leads, contacts and switches outwardly of the enclosure 188 may be easily assembled to the remainder of the speed regulator when installation of the speed regulating mechanism contained in enclosure 188 is made in a vehicle.

A lead 214 extends from junction point 212 for connection to both the vacuum supplying solenoid 22 and advance solenoid valve 174. A contact 216 is electrically connected to lead 214, with a lead 218 extending therefrom towards solenoid coil 258 of the solenoid valve 22. A one-way current passing diode 220, serving as an anti-advanced diode (to be explained later), is connected at one of its sides to the lead 218, while a lead 222 extends from the opposite side of the one-way current passing diode 220 and is connected, in turn, to a contact 224 mounted on an end coil of a solenoid coil 258 for the vacuum supplying solenoid valve 22. A lead 226 extends from the other end coil of solenoid coil 258 for attachment to a contact 228 providing a flow path for current to the low speed switch 122. A lead 230 extends from the opposite contact 121 of switch 122 to ground indicated at 232 so that an electrical circuit is completed from grounded battery 190 to closed switches 194 and 200 and through vacuum supplying solenoid valve 22 to ground at 232. This provides a circuit means indicated generally at 236 which actuates the solenoid valve 22 to impose a vacuum on servo bellows 18 by the upward movement of plunger 23.

Contact 216 is also attached to a lead 238 that extends to a contact 240 mounted with an end coil of solenoid coil 174A of advance solenoid 174. The opposite end coil of solenoid coil 174A is connected to a lead 242 with this lead extending to a contact 244 mounted on the frame 187 of the advance solenoid 174. Current passes through a portion of the frame 187 and from it through a contact 246 also mounted on the solenoid frame 187. Current then flows from this contact into a lead 248 which goes to ground at 250. A circuit means 251 for actuation of advance solenoid valve 174 is thus formed so that current flows from grounded battery 190 through closed switches 194 and 200, contact 216 and thence through the advance solenoid circuit means 251 including armature 174A of advance solenoid valve 174 to ground at 250.

With the power supply on and switch 200 in its closed position (vacuum supplying solenoid valve 22 and advance solenoid valve 174 actuated) current also flows through the contact 224 to a lead 252 adjacent vacuum supplying solenoid valve 22 and thence to a contact 254 mounted on the solenoid frame 276 of vacuum supplying solenoid 22. A contact 256 is also mounted on solenoid frame 276 of vacuum supplying solenoid valve 22 so that a portion of the conductive solenoid frame 276 provides a flow path between these two contacts. Current then flows from contact 256 through a lead 260 and a one-way current passing anti-relock diode 262 to a lead 264 attached to one end coil of the coupling coil 134. Current then flows into a contact 266 mountingly attached to the other end coil of the coupling coil 134 and from it to a lead 268 that joins to a contact 270 on the blade 296 of decoupling switch 178.

A path for current flow from the blade 296 to ground is provided through the armature 176 abutting the blade 296, to a conductive flange 272 connected to the armature and thence to the conductive spring 173 impressed between the flange 272 and the frame 187 of the advance solenoid valve 174. Current flows from the frame 187 to ground at 250 through the contact 246 attached to frame 187. Thus, since the spring 173 normally biases the armature 176 against the blade 296, the coupling coil 134 is momentarily energized when the switch 200 is closed against contact 206. However, at this same instant of time current is in the lead 238 so that the advance solenoid 174 is actuated, moving the armature 176 leftwardly to break electrical connection between the blade 296 and armature 176 so that the holding coil 134 is only momentarily actuated by closing of switch 200 and thus only momentarily lockingly coupled to valve plate 136.

Circuit 251 for the advance solenoid 174 has already been described. Its operation relative to the operation of the advance solenoid 174 will now be related. The advance solenoid 174 is normally urged into open position by the urging spring 173 so that the flow of atmospheric air through the port 172 is permitted without impediment. Upon actuation of the advance solenoid circuit 251 the solenoid armature 176 is urged leftwardly so that a plunger 177A carried on the left end thereof abuts against a seat 172A in the aperture 172. Such action of the advance solenoid valve 174 limits the amount of atmospheric air entering the housing 46 to that leading through bleed screw port 179. However, the exterior of the housing and cover assembly 188 is at this time at atmospheric pressure with a constant bleed of atmospheric air being provided by orifice 179 thereby insuring that the throttle advance lead is not too rigid. Since the bleed screw 175 is threadedly adjustable a desired throttle advance lead may be obtained by opening or closing a portion of the orifice 179 by it so that the orifice and bleed screw provide a means for modulating the throttle advance lead of the vehicle.

A holding circuit means indicated generally at 274 is also provided within the enclosure 188 for supplying current to the vacuum solenoid valve 22 while preventing supply of current to the advance solenoid 174, thus maintaining the solenoid valve 22 and holding coil 134 in actuated condition and maintaining the desired vehicle speed once it has been reached. Long lead line 199, disposed outwardly of enclosure 188, also extends oppositely from its junction with the lead 201 and is attached by a contact 278 to a lead 280 which extends to and terminates at a contact 282 of a brake switch 284. The brake switch 284 is spring loaded (not shown) to remain closed (unless the brake of the vehicle is actuated) to thereby pass current to a contact 286 of the switch which, in turn, is attached to a lead 288 electrically connected to a female terminal 290. The terminal 290 is mounted on the enclosure 188 and similar to the described terminals 210 and 212 so that the lead 288 may be easily connected thereto. A lead 292 extends inwardly of the enclosure 188 from the female terminal 290 to a contact 294 on a conductive flange 181B on the solenoid armature 181.

Current flows through the armature 181 and into a lead provided by the adjusting screw 180 and a portion of the solenoid frame 276, the armature 181 contacting the adjusting screw 180 and providing an electrical flow path therebetween (when the solenoid is in its upper or vacuum supply position). Current then flows into contact 254 and through lead 252 to contact 224 on one end coil of solenoid coil 258 to maintain current flow through the solenoid coil 258. Current is led to ground through lead 226 and low speed switch 122. By this arrangement, once vacuum has been applied to vacuum supplying solenoid 22 and the armature 181 urged into contacting position with screw 180 a circuit is completed for holding solenoid 22 in vacuum applying position until disabled by the opening of brake switch 284 or low speed switch 122. Of course, no current can flow to lead 218 and the advance solenoid 174 at this time since anti-advance diode 220 acts as a one-way valve to prevent current flow in this direction and thus advance solenoid 174 is not activated by current in holding circuit 274.

A coupling coil circuit 298 which magnetically locks the coupling coil 134 to valve plate 136 and thereby provides proper monitoring between atmospheric and vacuum supply to the servo bellows 18 is also provided. This circuit includes a solenoid armature 181 which contacts adjusting screw 180 (when the solenoid armature 181 is in upper position) the solenoid frame 276 carrying the screw 180 which provides contact for flow of current to the frame 276 and thence to the contact 256 mounted thereon. Current is then lead through the lead 260 and the one-way current passing diode 262 and the lead 264 so as to connect to one end coil of the coupling coil 134. Contact 266 connects the coupling coil 134 to that portion of the circuit just related and provides a flow path for current to ground through lead 268 attached to switch blade 296. The switch blade 296 at this time abuts the flange portion 272 so that current flows through the spring 173 to ground by way of the contact 246 and lead 248.

From the circuitry just described it is apparent that the holding coil 134 would be disabled thereby unlocking the valve plate 136 when the brake switch 284 or the low speed switch 122 is opened. However, a manual throttle push through by the operator does not break the magnetic connection between the holding coil 134 and valve plate 136 so that the vehicle will again resume a previously set speed once the manual force on the throttle is no longer working against the servo bellows 18.

To provide a "memory" for the holding coil 134 when its holding circuit 298 has been disabled by the opening of brake switch 284 an additional holding circuit 300 is provided which includes a lead 302 extending from the female terminal 210 mounted on the enclosure 188. This circuit is always actuated when the holding coil 134 has once been magnetically moved against the bracket 153. A contact 304 mounted on the valve plate 136 is attached to the end of the lead 302 so that the valve plate serves as a current carrier with current passing to the coupling coil frame 153 when the valve is placed in its magnetically locked position as above related. Current thus flows into the frame 153 through the valve plate 136 and thence to a contact 306 mounted on the frame 153 and attached to a lead 308. Lead 308 extends to and is attached to the lead 264 by contact 310. It should be clear that current may then flow into the coupling coil 134 and to ground through lead 268, switch 178 and a portion of the frame advance solenoid 174. By this arrangement the coupling coil 134 is locked to the valve plate 136 even when the brake switch 284 is open so that a particular setting of the servo bellows 18 will be reobtained as soon as solenoid valve 22 is again placed in vacuum supplying position. Current at this time, of course, cannot flow backwardly into lead 260 to actuate solenoid valve 22 since the anti-relock diode 262 prevents current flow from lead 264.

To obtain a resume speed condition after the brake switch 284 has been opened thereby disabling the holding circuts 274 and 292, a resume switch 312 is provided having a contact 314 attached to the long lead 199 and a contact 316 attached to a lead 318 extending to a contact 320. The contact 320 is conveniently attached to a screw 322 mounted and extending outward from the enclosure 188. Manual actuation of the switch 312 provides a current path across the contacts 314 and 316 so as to provide current at the screw 322. Inwardly of the enclosure 188 a lead 324 is attached to contact 326 also mounted with the screw 322 with the lead 324 extending to a contact 328 on the lead 260. This contact is, of course, placed on the current carrying side of anti-relock diode 262. Current is, therefore, provided with a flow path through the lead 260 to the contact 256 on the solenoid frame 276 and thence through a portion of the solenoid frame 276 to the contact 254. Current flows from the contact 254 through the lead 252 and from it to contact 224 mounted on one end coil of solenoid coil 258. Lead 226 provides a path of current flow to ground indicated at 232 through the low speed switch 122. The just related flow path thereby provides a resume circuit means 269 for the speed regulator system 10. By this arrangement manual depression of the resume switch 312 actuates solenoid valve 22 providing a vacuum for the servo bellows 18, the said vacuum being modified by the entrance of atmospheric air through the port 27 so that the vehicle again accelerates automatically to the speed set by the "memory" maintained by the coupling coil 134. The actuation of resume switch 312, of course, does not provide actuation for the solenoid valve 174 and rapid advance of the throttle 12 since no current is free to flow outwardly through lead 222 to lead 218 because of the one-way valve function of anti-advance diode 220.

Lead 318 also has attached to it a contact 330 which provides a flow path through a lead 332 to a signal light 334 that is grounded at 336. This signal light may conveniently be mounted on the dash in a manner somewhat similar to the signal light 202 to provide a visual indication that the resume switch 312 is in a current carrying condition.

The operation of this embodiment of the invention will now be described. The vehicle is accelerated to a speed that is above the low speed setting of low speed switch 122 (generally 25 m.p.h.) so that this switch is moved to a closed position. The speed regulating system 10 may then be utilized either to manually set speed at a desired speed or to accelerate the vehicle to a desired speed. To manually set a desired speed the vehicle is accelerated to the desired speed and the switch 200 momentarily depressed to place the contacts 196 and 206 in a closed current carrying condition. Current is supplied from the grounded battery 190 through contact 196 to contact 206 (switch 194 in closed position). Current then flows from contact 206 through lead 208, lead 214, lead 218, anti-advance diode 220, solenoid coil 258 and lead 226 to ground at 232. Thus the vacuum supplying solenoid value 22 is urged into an upper vacuum supplying position to provide a supply of vacuum to the servo bellows 18. At the same time, current flows from the lead 214 into the lead 238 to actuate the advance solenoid 174 and move it to a non-contacting position with the switch blade 296 thereby momentarily closing the port 172 and limiting the flow of atmospheric air to the enclosure 188. Opening of switch blade 296 prevents the grounding of current flow from the lead 222 through the solenoid frame 276, the anti-relock diode 262, the lead 264 and the solenoid coil 134 thus disabling and unlocking the coupling between the solenoid coil 134 and valve plate 136. By this arrangement, the solenoid coil 134 is only momentarily locked to the valve plate 136. Once the armature 181 of solenoid valve 22 assumes its upper, full vacuum supplying position and the switch 200 is released advance solenoid 174 moves rightwardly again into contacting position with blade switch 296 thereby providing flow of current to ground through the holding coil 134 and locking in the speed control system 10 at the desired speed.

In the event that throttle advance is desired by the use of the advance function of the speed control system 10, the switch 200 is held in depressed position longer than momentorily thereby providing a current flow through the contacts 196 and 206 for a sufficient length of time as to permit the vehicle to accelerate to that speed desired. Operation of the circuitry within the enclosure 188 at this time is quite similar to that just described, the primary difference being that the advance solenoid 174 is maintained in closed position over the port 172 (by current flow through lead 238) to permit a larger degree of vacuum to be supplied to the servo bellows 18 thus accelerating the vehicle through movement of the throttle pedal 12 by the bead chain 14.

If the vehicle is accelerated by pushing of the throttle against the maintaining action of the servo bellows 18 sufficient override is accommodated by the lost motion means provided by the spring loaded slider member 130 to permit free play between the Teflon coated plate 133 and flyball governor 30 to permit the locking coil 134 to magnetically hold the bracket 153 against the valve plate 136 thus maintaining a "memory" in the speed regulator. As soon as throttle lever 12 has operator pressure removed therefrom the servo bellows 18 will again bring the vehicle back to the set speed.

If the vehicle is decelerated rapidly by the brake, brake switch 284 opens, thus opening the circuit which holds the solenoid valve 22 in vacuum supplying position. At this time, however, current is maintained in coupling coil 134 through the circuit 300 including the current carrying valve plate 136 and frame 153 in the lead 268, switch blade 296 and contact 246 thus providing a "memory" for speed control system 10. Once pressure has been taken off and the brake pedal resumes its undepressed position, the brake switch 284 again closes. Actuation of resume switch 312 by the vehicle operator will provide a supply pressure of current to the lead 318, to the solenoid coil 258 of the solenoid valve 22 by means of the solenoid frame 276, contacts 254 and 224. Thus, a vacuum supply is again provided for the servo bellows 18 and the speed regulator will automatically accelerate the vehicle to the previously set speed which is maintained within the system by the coil 134 locked to the valve plate 136.

In a second embodiment of the invention illustrated specifically in FIG. 9, a speed regulator system 10' is provided which is somewhat similar to the embodiment illustrated in FIG. 8 except that holding coil 134 is locked in at all times whenever its power supplying circuit is placed in a current carrying condition.

Supply of current to the speed regulator system 10' is provided by a circuit 189' conveniently mounted outwardly of the speed regulator enclosure 188. It includes a grounded battery 190 which is connected in series with a fuse 192 operative to disable the flow of current in the speed regulator system 10' in the event of a short within it. A lead 193 extends from the fuse 192 to a contact 194A of a relay switch 194', with the opposite contact 194B of the relay switch having a lead 195 attached to it and leading to and terminating in a contact 195A. A lead 197 extends from the contact 195A to a grounded magnetizable coil 197A forming a part of the relay switch 194'. This coil holds the relay switch 194' closed after manual actuation of it until circuit 189' is interrupted by turning off the vehicular ignition switch (not shown) and thereby terminating the circuit to the power supply afforded by the grounded battery 190.

A lead 197B also extends from the contact 195A to a contact 195C disposed in and electrically communicating with a long lead 199 to thereby provide a power supply path to a switch 200', this switch serving as the manual speed set and speed advance switch. A contact 195D in long lead 199 is attached to a lead 195E which terminates in a contact 196 of switch 200' for this purpose. Contact 196 is, of course, positioned so that full depression of switch 200' to its dotted line position (indicated at 205') against the urging of spring 203 provides a current flow to a pair of contacts 206 and 206A of switch 200' being in circuit with the speed regulator's electrically and mechanically actuating operating and controlling components.

Contact 206 is attached to a lead 208 that extends to a female terminal 212 located on the exterior of the enclosure 188 for easy attachable insertion of the lead 208. Inwardly of the enclosure 188 a lead 214 extends to a contact 240 on one coil of advance solenoid 174. A lead 242 is attached to the opposite end coil of solenoid advance coil 174A, said lead also being connected to a contact 244 mounted on a solenoid frame 187 of the advance solenoid 174. Current passes through this contact and the solenoid frame to a contact 246 mounted thereon and from it to ground through an attached lead 248. Thus, depression of the switch 200', with the on relay switch 194' closed, provides a flow path for electricity through contact 206, lead 208, terminal 212, lead 214, advance solenoid coil 174A, leads 242 and 248 to ground. By this circuit arrangement an advance circuit means 251' is provided so that the advance solenoid 174 may be actuated to move its plunger member 177A leftwardly to seal off port 172.

At the same time a contact 206 is provided with a flow of current through switch 200' by the closing thereof, contact 206A is also provided with a flow of current from contact 196. From contact 206A current flow is into a lead 207 attached to the said contact and from it to a contact 209 electrically attached to a lead 318. Lead 318 is disposed outwardly of the enclosure 188 and extends to and is attached to a contact 320 mounted on a screw 322 extending outwardly of the enclosure 188. A contact 326 is mounted inwardly of the enclosure 188 on the screw 322 and provides for easy attachment of a lead 324 extending to and connected to a solenoid frame 276 of vacuum actuating solenoid 22 by a contact 256. Flow of current occurs through a portion of solenoid frame 276 and from it to a contact 252 that is mounted on one end coil of solenoid coil 258 of vacuum solenoid 22. A lead 226 extends from the opposite end coil of solenoid coil 258 to a low speed switch 122 having a lead 230 extending therefrom to ground at 232. By this arrangement a circuit is formed from contact 206A, lead 207, contact 209, lead 318, screw 322, lead 324, contact 256, a portion of solenoid frame 276, contact 252, solenoid coil 258, lead 226, low speed switch 122 and lead 230 to ground at 232. This circuit arrangement provides a circuit means 236' for the supply of vacuum to the servo bellows 18 by current flow to vacuum actuating solenoid 22 to actuate its armature 181 upwardly opening a flow path from the vacuum supply line 20.

A holding circuit 274' for vacuum actuating solenoid 22 is also provided in the speed regulator system 10'. Long lead 199 extends to a female terminal 210 mounted on the enclosure 188, the female terminal again being provided for easy insertable connection of the long lead 199. A contact 278 mounted with the terminal 210 is connected to a lead 280 extending to a contact 282 of a brake switch 284, the said brake switch opening upon operation of the brake pedal. An opposite contact 286 of the brake switch 284 is attached to a lead 288 extending to and inserted in a female terminal 290 mounted on the enclosure 188. A lead 292 extends inwardly of the enclosure 188 from the female terminal 290 to a contact 294 mounted on a flange member 181B of vacuum supplying solenoid 22. With the solenoid armature 181 in its upper vacuum supplying position (actuated thereto as described above) armature 181 engages an adjusting screw 180 on solenoid frame 276 permiting current to flow through a portion of solenoid frame 276 to the contact 252 and thence through solenoid coil 258. The lead 226, low speed switch 122 and lead 230 provide a path for current flow to ground at 232. Thus a holding circuit is provided to maintain the solenoid valve 22 in an actuated vacuum supplying position, once actuated to this position. As is evident, this circuit may be disabled by either opening of the brake switch 284 or low speed switch 122.

A holding circuit means 300' for lockingly coupling holding coil 134 to valve plate 136 is also provided thus insuring that the speed regulator system 10' has a "memory" whenever a set speed has once been selected by the use of the switch 200'. This circuit comprises a lead 302 extending from the lead 199 by attachment to the female terminal 210. The lead 302, at its opposite end, is connected to a contact 310 mounted on one end coil of holding coil 134. The opposite end coil of holding coil 134 has attached thereto a contact 266 which is electrically connected to a lead 268 extending to a blade 296 of a decoupling switch 178. Current flow is through the blade 296 to a flange 272 of the advance solenoid coils 174 and from it to an abutting spring 173. The spring 173 contacts a portion of the valve solenoid frame 187 of advance solenoid 174 and passes current to it. A contact 244 and lead 248 provide a path of current flow to ground. It should be clear from the above description that the coupling coil 134 is always locked to the valve plate 136 when on relay switch 194' is actuated save for that time when the switch 200' is depressed moving the advance solenoid 174 leftwardly away from the decoupling switch 178 and thereby breaking its circuit to ground.

In order to actuate the vacuum solenoid 22 after deceleration by braking (a disablement of the holding circuit 274' by actuation of the brake) a resume circuit 209' is provided. Attached to the contact 195D which is electrically connected to long lead 199 is a contact 314 of a resume switch 312, the said switch being capable of closing contact 314 and a contact 316 and supplying current to the contact 209 in the lead 318. Current then flows into lead 318, contact 320, screw 322, contact 326, lead 324, contact 256, a portion of frame 276, contact 252, coil 258, lead 226, closed speed switch 122 and lead 230 and from thence to ground at 232. The resume switch 312 thereby provides vacuum for the servo bellows 18 without advancing the advance solenoid 174 and interrupting the holding circuit for the coupling coil 134, the said vacuum being modulated by atmospheric air as governed by the locked in coupling coil 134 to provide the vehicle with the previously set speed.

The operation of the second embodiment of the invention will now be described. Once the vehicle has been accelerated above 25 m.p.h. and the low speed switch 122 has closed, any desired governed speed may be set by the speed regulator system 10'. On relay switch 194' is placed in an on position thereby locking in coupling coil 134. Switch 200' is depressed to its dotted line position 205', providing current flow to the advance solenoid 174 through lead 214, contact 240, solenoid coil 174A and therefrom to ground through lead 248. The advance solenoid 174 moves leftwardly closing off a major portion of the flow of atmospheric air through port 172 to the interior of enclosure 188. At the same time current flows through contact 206A into the lead 318, through the screw 322 and then into the frame 276 of vacuum actuating solenoid 22. From there current flows into contact 252 and solenoid coil 258 and from it to ground at 232. This places a vacuum on the servo bellows 18 by moving the armature 181 of the solenoid valve 22 upwardly.

Since the closing of switch 200' breaks the contact between the decoupling switch 178 and advance solenoid 174 the circuit to ground for the holding coil 134 (through the lead 268, etc.) is broken, permitting the valve plate 136 to assume the proper positioning for the desired set speed. As soon as switch 200' is permitted to return to its outer spring urged position, the holding coil 134 is again locked in thus placing the vehicle under a set controlled speed.

It should be evident from the above description that depression of the switch 200' for more than a momentary time period will cause an automatic acceleration of the vehicle due to lengthened time that the advance solenoid 174 closes off the port 172. It should also be clear that this acceleration will continue until the switch 200' is permitted to return to its outermost position at which time the speed reached by the vehicle will be the set controlled speed.

Once a set controlled speed is being maintained by the speed regulator system 10' and the vehicle operator wishes to accelerate rapidly, he may do so by depression of the vehicle throttle pedal, the throttle pedal working against the urging of servo bellows 18 and overriding it. At this time the coupling coil 134 remains locked to the valve plate 136 and the lost motion provided by the spring loaded slider member 130 accommodates relative motion between the flyball governor 30 and Teflon coated plate 133 thus accommodating throttle override. Since the holding coil 134 is still locked in (provided "memory"), as soon as the throttle is released the vehicle again resumes the previously set speed.

When braking is applied, the switch 284 will open thereby removing current from lead 292 and solenoid coil 258 so that the armature 181 moves downwardly eliminating the vacuum supply from the servo bellows 18. The holding coil 134 is still locked in at this time (through lead 302) with the lost motion connection provided by the spiral spring 170 accommodating the relative motion between the slider member 130 and pin 132. To resume the previously set speed, pressure on the brake is removed permitting the brake switch 284 to close and the resume switch 312 is depressed providing a vacuum to the servo bellows 18 through actuation of the vacuum solenoid 22 which obtains its current supply through lead 318. Servo bellows 18 is thereby brought back to its equilibrium point and the previously set speed reached and maintained.

In a third embodiment of the invention, illustrated specifically in FIG. 10, a speed control system 10″ is provided which adds the feature of speed retard to the features present in the embodiment of the invention illustrated in FIG. 8. This embodiment of the invention still retains the manual speed set, speed advance and speed resume features of the first embodiment and additionally provides a means to automatically decelerate the vehicle through manual actuation of the speed regulator system 10″.

A power supply circuit 189″ includes a grounded battery 190 that is connected in series with a fuse 192 having a lead 193 extending therefrom for connection to an on switch 194. A lead 195 extends from the opposite contact of the switch 194 and has a signal light 202 connected thereto which is grounded at 204, the signal indicating visually when the switch 194 is in closed position and the power supplying circuit 189″ in active, power supplying condition.

Lead 195 extends beyond its connection with the signal light 202 to connect to a contact 196 of a three position switch 200″. Switch 200″ is spring biased leftwardly by spring means 203 so as to close a contact 196 to provide an active current carrying position 200A″. Switch 200″ is also provided with a pair of contacts 206, 206A situated so as to be in carrying condition relative to the contact 196 dependent upon the position of the switch 200″. In the position 200A″ contacts 196 and 206 are placed in current passing relation, in a manually actuated position indicated by dashed lines at 200B″ the switch 200″ places the contacts 196 and 206 and 206A in a current passing relation. In a third position of the switch indicated by chain dotted lines at 200C″, contact 196 is no longer in current carrying position relative to the remainder of the switch 200″, that is, at such position the plunger portion of the switch 200″ is in a non-physically contacting relation with the power supplying contact 196 so that current cannot be transferred to the contacts 206 and 206A.

Contacts 206 and 206A are connected, respectively, to leads 208 and 211, with the said leads extending to a pair of female terminal blocks 210 and 212 mounted on the enclosure 188 of the speed regulator. A lead 214′ extends from the terminal 212 inwardly of the enclosure 188 and joins to a low speed switch 122. A lead 218′, forming a part of the vacuum supply actuating circuit 236″, extends from the opposite contact of the said switch and is attached to a one-way current passing diode 220. A lead 222 extends from this diode at its opposite side to a contact on one end coil of a solenoid coil 258 of vacuum supplying solenoid 22. The opposite end coil of the solenoid coil 258 is attached to a lead 226′ that goes to ground at 232. The above related elements from the lead 218′ onwards provide an actuating circuit for vacuum advance solenoid 22 to urge its armature 181 upwardly and provide a vacuum supply for servo bellows 18.

An advance solenoid circuit 251″ is also provided which includes a lead 238 that also extends from lead 218 to a contact 240 on one end coil of a solenoid coil 174A of an advance solenoid valve 174. A lead 242 extends from the opposite end coil of solenoid coil 174A and is attached to a contact 244 mounted on a solenoid frame 187 of the advance solenoid 174. Current flows through this contact and a portion of the solenoid frame 187 to a contact 246 mounted on the frame 187 and attached to a lead 248 extending to ground. By this circuit arrangement an actuating circuit for advance solenoid 174 is provided so that depression of switch 200″ not only actuates solenoid 22 into its vacuum supplying position but also actuates advance solenoid 174 leftwardly to close off port 172.

A holding circuit for coupling coil 134 is also momentarily provided by the actuation of switch 200″ to its position indicated at 200B″. A lead 252 extends from the contact 224 on one end coil of solenoid coil 258 to a contact 254 mounted on solenoid frame 276 of vacuum supply solenoid 22. Current passes through this lead and contact into a portion of the solenoid frame 276 and from there to a contact 256 mounted on the solenoid frame 276. A lead 260 connected to contact 256 extends to one side of a one-way current passing diode 262 with a lead 264 extending from the opposite side of this diode and being attached to a contact 310 mounted on an end coil of the coupling coil 134. Contact 266, attached to the other end coil of the coupling coil 134, provides an easy connection for a lead 268 extending therefrom and attached to a contact 270 mounted on the blade 296 of decoupling switch 178. The switch blade 296 contacts a flange 272 of the solenoid coil (through the armature 176) and electricity is conducted through this flange and a spring 173 to the solenoid frame 187. Current flows from the solenoid frame 187 through the contact 246 and lead 248 to ground. It should be clear from the above description that actuation of the switch 200″ to the position indicated 200B″ momentarily locks in coupling coil 134 as in the previous embodiments of the invention until the advance circuit 251″ moves the advance solenoid 174 leftwardly to break contact between it and decoupling switch 178.

In order to maintain a "memory" in the speed regulator system an additional holding circuit 300″ for the holding coil 134 is provided. A lead 302 extends inwardly of the enclosure 188 from the female terminal 210 so as to be connected to a contact 304 mounted on the valve plate 136. With this valve plate magnetically held against the bracket 153 current flows from the contact 304 through the valve plate 136 and into a portion of the bracket 153. Contact 306 mounted on the bracket 153 provides a flow of current to a lead 308 attached to the contact 306 and from thence to the contact 310. Current flows through the coupling coil 134, contact 266, lead 268, decoupling switch 178, flange 272, spring 173, solenoid frame 187, contact 246 and lead 248 to ground.

A vacuum solenoid holding circuit 274″ is also provided to maintain the vacuum solenoid 22 in actuated position after the switch 200″ has been permitted to return to its position indicated 200A″. A lead 280 extending outwardly of the enclosure 188 from the female terminal 210 terminates in a contact 282 of a brake switch 284. The opposite contact 286 of brake switch 284 has attached to it a lead 288 which extends to a female terminal 290 mounted on the enclosure 188. Thus easy attachment of the lead 288 may be obtained. A lead 292 extends inwardly of the enclosure 188 from the female terminal 290 to a contact 294 mounted on a flange 181B of a solenoid armature 181 of the solenoid valve 22. Current flows from the flange portion 181B into the solenoid armature 181 and from there to a screw 180 (when the solenoid armature 181 is in its upper vacuum supply position as actuated thereto as previously explained) and through the screw 180 into a portion of the frame 276 of the vacuum supplying solenoid 22. Current then flows to a contact 254, through the lead 252 and the contact 224 to the solenoid coil 258 and from it through lead 226′ to ground at 232. The circuit just described maintains solenoid valve 22 in vacuum supplying position, once actuated to this position by the switch 200″, until the brake switch 284 is opened by manual actuation of the brakes.

Current, of course, as this time can flow through the screw 180 with the solenoid armature 181 in its upper position and from the screw 180 to the contact 256 and thence through the holding coil 134 and to ground through the decoupling switch 178. However, actuation of the brake switch 284 or low speed switch 122 to open position will again disable this circuitry and also the vacuum solenoid holding circuit 274".

A resume circuit 209" is also provided. Outwardly of the enclosure 188 the lead 195 has attached intermediate its ends a lead 199' that extends to a contact 314 on resume switch 312. The opposite contact 316 of the resume switch 312 is attached to a lead 318 extending to a contact 320 mounted with a screw 322 extending outwardly of the enclosure 188. Contact 326 mounted on the screw 322 inwardly of the enclosure 188 is attached to a lead 324 that extends to the contact 328. When the resume switch 312 is placed in closed position, current flows from the power supply circuit 189" through the switch 312 and from it to the screw 322, lead 324 and contact 328. This provides a power supply in lead 260 which is attached to the solenoid frame 276 of vacuum supplying solenoid 22 by contact 256. Current flows through a portion of solenoid frame 276 to contact 254, through lead 252 and contact 224 on an end coil of solenoid coil 258. Lead 226' provides a path of current flow to ground at 232. It should be clear that actuation of the resume switch 312 provides a flow of current which actuates vacuum solenoid 22 thereby providing a vaccum supply to servo bellows 18 so that the vehicle may again resume the speed dictated by the position of the valve 136 as set by the locking of the holding coil 134 through the holding coil circuit 300".

A retard means is also provided by the speed control system 10" in order to retard or decelerate the vehicle once a set speed has been obtained the switch 200" is depressed to the position indicated 200C". This removes physical contact between power supply circuit 189" and the contacts 206 and 206A. The vacuum solenoid 22 moves downwardly since its solenoid coil 258 is no longer supplied with power and the spring urged throttle through spring 13 is urged to a decelerated position. At the same time the holding coil 134 is unlocked from the valve plate 136 through breaking of the holding circuit 300". Thus the servo bellows 18 expands due to the aforementioned spring 13 of the throttle 12 urging the throttle into vehicle decelerating direction. Atmospheric pressure, of course, is supplied to the servo bellows 18 through the port 27 to aid in its expansive movement.

In a fourth embodiment of the invention, illustrated specifically in FIG. 11, provision is made for the mounting of the manual controls for a speed control system 10"' on the steering wheel of an automotive vehicle. A series of slip rings are utilized for this purpose so that contact may be maintained between the controls mounted on the moveable steering wheel and the wiring leads extending through the steering wheel post to the remainder of the speed regulator system.

Power supply circuit 189"' includes a supply 190, said supply normally being a battery in series circuit with a fuse 192 which interrupts the supply of current to the remainder of the speed regulator system 10"' in the event of a short circuit existing therein. A lead 193 extends from the fuse 192 to a contact 194A of a magnetically held switch 194', the other contact 194B of the switch 194' being attached to a lead 195 which in turn extends to a contact 195A electrically connected to lead 197. Lead 197 extends to and is connected with one end coil of the solenoid coil 197A, the said coil being grounded from its other end coil. Thus, manual depression of the switch 194' provides a path for current to flow from the grounded supply 190 through solenoid coil 197A to ground so that the switch 194' is magnetically held in closed position once actuated thereto manually.

Contact 195A has a lead 197B extending oppositely from the lead 197 to provide a flow path for electrical current to a contact 195C mounted on a long lead 199".

The leftward extension of long lead 199" is attached to a contact 199A that physically abuts a slip ring 199B allowing relative motion between it and the slip ring but still maintaining an electrical path into the slip ring 199B. A contact 199C mounted with the slip ring 199B provides a convenient attachment for a lead 199D extending to a contact 199F mounted intermediate the ends of a lead 199G. The lead 199G extends between two switches 199H and 200"' thus providing a power supply contact for a switch blade 199I of switch 199H and a contact 196 of switch 200"'. Each of these switches is, of course, conveniently mounted on the steering wheel of the vehicle so as to be easily reached and thereby manually actuated by the vehicle operator. Switch 200"' provides for manual speed set and speed advance of the speed regulator system 10"' while switch 199H provides for speed resume and speed retard for the said speed regulator system.

An actuating circuit 236"' for vacuum actuating solenoid 22 is provided including a contact 206A' physically located so that manual closing of switch 200"' against the bias of spring 203' provides a flow path of electrical current from the contact 196 to the contact 206A'. A lead 206B extends away from the contact 206A' so as to be attached to a contact 206C mounted on a slip ring 206D, the said slip ring providing a sliding physical contact and electrical path between it and a contact 206E. A lead 319 is attached to contact 206E and extends outwardly of the enclosure 188 for attachment to a contact 320 mounted on a screw 322 extending through the enclosure 188. Contact 326 mounted on the screw 322 provides for attachment of a lead 324 mounted within the enclosure and extending towards the vacuum actuating solenoid valve 22. Lead 324 is attached to one side of a one-way current passing diode 325 (the purpose of which will be described later), with a lead 324A extending from the opposite side contact of the diode 325 to lead current away from it. A contact 256 on solenoid frame 276 of vacuum actuating solenoid 22 provides an easy connection for lead 324A so that a flow path for current is provided into a portion of the solenoid frame 276. Contact 252 mounted on another portion of the solenoid frame 276 leads the current to one end coil of solenoid coil 258 while the opposite end coil of solenoid coil 258 is connected to a lead 226. A low speed switch 122 is connected to lead 226 and provides a flow path of current through it to a lead 230 to ground at 232. By the circuit arrangement just described electrical current from the supply circuit 189"' will flow through the contact 206A' with the switch 200"' depressed to actuate the vacuum advance solenoid 22 and provide a supply of vacuum to servo bellows 18.

An anti-retard relay 412 is also connected to the vacuum supply actuating circuit 236"' to enable the actuation of the advance solenoid 174 at the same time as the switch 200"' provides for actuation of vacuum solenoid 22. One end coil of anti-retard relay 412 is connected to a contact 414 attached between the ends of the lead 319. The opposite end coil of anti-retard relay 412 goes to ground at 416. Thus flow of electrical current in lead 319 provides a flow path to ground through the anti-retard relay which moves a switch 418 of the anti-retard relay magnetically counterclockwise against the bias of a spring 420. A contact 422 of switch 418 is thereby put in circuit with a blade 424 of switch 418. As set out previously, depression of the switch 200"' provides a flow path for current through the contact 196 and 206A'. At the same time, a contact 206' of switch 200"' is physically located so that a flow path for current will exist between it and contact 196. A lead 206'A extends from the contact 206' to a contact 206'B physically mounted on a slip ring 206'C. A contact 206'D is in sliding physical abutment with the slip ring 206'C so that current flows through the slip ring to the contact 206'D and from it to a lead 206'E attached to the switch blade 424 of switch 418. Current may thereby flow to the contact 422 from the contact 206' of switch 200'''.

A long lead 199'' is attached at its end to the contact 422 and extends outwardly of the enclosure 188 for easy attachable insertion in a female terminal 212 mounted on the enclosure 188. A lead 214 extending inwardly of the enclosure 188 is also attached to the female terminal 212 and extends from it to a contact 240 mounted on one end coil of a solenoid coil 174A of advance solenoid 174. A lead 242 extends from the opposite end coil of advance solenoid coil 174 and is attached to a portion of a frame 187 of advance solenoid 174 by a contact 244. A contact 246 also mounted on a portion of the frame 187 provides a flow path of current to ground through a lead 248. By the advance circuit means 251''' just described a flow path for electricity is provided through the contact 206' (upon depression of the switch 200''') to the slip ring 206'C and from it through the switch blade 424 to the contact 422 and thence through long lead 199'' into the enclosure 188. Lead 214 provides a flow path to the advance solenoid coil 174A which is grounded through lead 248.

A coupling coil holding circuit 300''' for coupling coil 134 to valve plate 136 is provided by a rightward extension of the long lead 199'. This end of the long lead 199' is insertingly attached to a female terminal 210 mounted on the enclosure 188. A lead 302 extending inwardly of the enclosure 188 and also attached to female terminal 210 extends to a contact 310 mounted on one end coil of the coupling coil 134. A contact 260 on the opposite end coil of the coupling coil is attached to a lead 268 which extends to decoupling switch 178. Current flow is through this decoupling switch to a flange 272 of the advance solenoid 174 (through the abutting end of the armature) and from it to the urging spring 173. The abutment of the urging spring 173 with solenoid frame 187 provides a flow for current to ground through the contact 246 and lead 248.

A holding circuit 274''' for vacuum actuating solenoid 22 is also provided. A lead 280 extends outwardly of the enclosure 188 from the female terminal 210 for attachment to a brake relay switch 284', a contact 282' of the brake relay switch 284' providing for this attachment. An opposite contact 286' of the brake relay switch is attached to a lead 288 that extends to and is insertingly held in a female terminal 290 mounted on the enclosure 188. A lead 292 extends from the opposite side of the female terminal 290 for attachment to a contact 294 mounted on a flange 181B of the vacuum actuating solenoid 22. With the vacuum actuating solenoid 22 in its upper position an armature 181 of the vacuum actuating solenoid contacts a screw 180 on the frame 276 of the solenoid. Current flows through the flange 181B into the armature 181 and then into the screw 180. A portion of the frame 276 provides a flow path of current to contact 252 mounted on the solenoid frame and from it through vacuum actuating solenoid coil 258 to ground at 232. By the circuit just described, it should be clear that depression of the switch 200''' to move vacuum supply solenoid 22 into vacuum supply position provides a holding circuit through the screw 180 to maintain the armature 181 in this position until disabled by the brake relay switch 284' or low speed switch 122.

The one-way current passing diode 325, mentioned above, prevents actuation of the coil of the anti-retard relay 412 when the holding circuit (through the screw 180) for the vacuum supplying solenoid 22 is in active condition. More specifically, since current is flowing in the frame 276, the contact 256 is activated which would normally permit current to flow through the lead 324 to the contact 414 to thereby move the switch blade 424 leftwardly against the contact 422. This would provide a flow of current to the advance solenoid 174 through the lead 414 thereby actuating the advance solenoid any time the vacuum holding circuit 274''' was active. The one-way current passing diode 325 prevents this from occurring since it blocks the flow of current into the lead 324 from the lead 324A thereby insuring that actuation of the holding circuit for vacuum supplying solenoid 22 does not provide throttle advance to the throttle 12.

A circuit arrangement 347 is provided for retarding the velocity of the vehicle which includes the switch 199H. When this switch is in its rightward position, the switch 200''' not being actuated, no current flows to the coil 412 thus the switch blade 424 is also in its rightward position due to the urging of spring means 420. Current may then flow through the switch 199H from the contact 199F to the contact 206'B and therethrough into the slip ring 206'C to be fed to the switch blade 424. A lead 426 contacted by this switch blade extends to a contact 428 disposed outwardly of the enclosure 188. A grounded solenoid 430 is disposed in series with the contact 428 so that current flowing through the circuit just described actuates the solenoid 430 to automatically apply the vehicular brake by any conventional linkage (not shown). Contact 428 is also connected to a lead 432 extending to a one-way current passing diode 434. A lead 436 extends from the opposite side of this diode and connects to one end coil of a coil 438 of brake relay switch 284'. Current flowing through coil 438 magnetically attracts a switch blade 285 of the brake relay switch leftwardly thereby opening the contact 286' and disabling current flow to the vacuum solenoid 22 and eliminating vacuum supply to the servo bellows 18.

In order to insure that the brake relay switch 284' opens whenever the brake is actuated (either by the solenoid 430 or manually), an additional 12 volt power supply tap indicated by a battery 440 is placed in series relationship with a brake light switch 442. Whenever the brake pedal (not shown) is depressed the contacts on brake light switch 442 are closed thereby providing a flow of current to a lead 444 which joins with the lead 432 by means of a contact 446. Thus, an alternate supply of power is provided to insure the actuation of the solenoid coil 438 to thereby open (move leftwardly) the switch blade 285. Opening of the switch blade 285 as set out above insures removal of current flow from the leads 288 and 292 thereby disengaging the holding circuit for the vacuum supplying solenoid 22. Armature 181 moves downwardly closing off the vacuum supply to servo bellows 18 and the spring loaded throttle 12, in conjunction with the applied brake, retards the vehicle speed.

It should be noted that even though electrical supply to the lead 292 and thereby the vacuum supplying solenoid 22 has been interrupted current still may flow into the lead 302 so that spring loaded coupling 134 is still lockingly held to the valve plate 136 providing a "memory" for the speed regulator system 10''' even when the retard feature of the said system has been actuated. The original speed locked into the coupling coil 134 may be reattained merely by movement of the switch 199H leftwardly to provide a flow of current through the lead 319 to reactivate the vacuum supply solenoid 22 and thereby provide a supply of vacuum to the servo bellows 18. Thus a resume circuit means 209''' is provided by leftward movement of switch 199H.

While several embodiments of this invention have been shown and described, it is readily apparent that many changes can be made therein.

What is claimed is:

1. A circuit for a speed regulator system including (a) a vacuum solenoid actuating circuit for activating a vacuum supplying solenoid, (b) an advance solenoid circuit electrically coupled to said vacuum solenoid actuating circuit, (c) a solenoid holding circuit electrically connected to said vacuum solenoid actuating circuit, (d) a coupling coil circuit, (e) said coupling coil circuit being placed in active current carrying condition by deactivation of said advance solenoid circuit, and (f) resume circuit means for reactivating said vacuum supplying solenoid circuit after deactivation thereof.

2. The combination set out in claim 1 wherein a one-way electrical passing means is disposed in said solenoid holding circuit for preventing actuation of said advance solenoid circuit upon reactivation of said solenoid holding circuit.

3. The combination set out in claim 1 wherein said coupling coil circuit becomes activated only after actuation of said vacuum solenoid actuating circuit.

4. The combination set out in claim 1 wherein said coupling coil circuit becomes immediately activated solely upon activation of an on switch providing power for said circuit arrangement for a speed regulating system.

5. The combination set out in claim 4 wherein a power supply for said circuit arrangement for a speed regulating system is provided through a slip ring means.

6. The combination set out in claim 4 wherein actuation of said vacuum solenoid actuating circuit provides a supply of power for certain of the elements of said resume circuit.

7. The combination set out in claim 1 wherein a one way electrical valve means is disposed between said coupling coil circuit and said vacuum solenoid actuating circuit for preventing activation of said vacuum solenoid actuating circuit when said coupling coil circuit is solely activated.

8. The combination set out in claim 1 wherein said coupling coil circuit includes a valve plate means.

9. The combination set out in claim 8 wherein said circuit arrangement for a speed regulating system is provided with at least one 2-position switch.

10. The combination set out in claim 8 wherein said circuit arrangement for a speed regulating system is provided with at least one 3-position switch.

11. The combination set out in claim 1 wherein said resume circuit includes a brake activating solenoid.

12. The combination set out in claim 1 including a power supply circuit with said solenoid holding circuit including a brake relay switch, said brake relay switch opening upon activation of the vehicle brakes.

13. The combination set out in claim 12 wherein a supplementary power supply is provided to operate the brake relay switch.

14. The combination set out in claim 13 wherein a series of three slip rings are utilized to permit a flow of power to the other circuits of the speed regulator system.

15. A circuit for a speed regulating system including (a) a vacuum solenoid actuating circuit for actuating a vacuum supplying solenoid, (b) a solenoid holding circuit electrically connected to said vacuum solenoid actuated circuit, (c) a coupling coil circuit for magnetically lockingly coupling a coupling coil for monitoring a flow of air to the vacuum supplied by said vacuum supplying solenoid, and (d) resume circuit means for reactivating said vacuum supplying solenoid after interruption of said solenoid holding circuit.

16. A circuit for a speed regulating system including (a) a vacuum solenoid actuating circuit, (b) a solenoid holding circuit electrically connected to said vacuum solenoid actuating circuit, (c) a coupling coil circuit for magnetically lockingly coupling the coupling coil, said coupling coil circuit including elements of an advance solenoid actuating circuit, (d) said coupling coil circuit remaining activated at all times until disabeld by actuation of said advance solenoid actuating circuit.

17. A speed regulating system including (a) first servo motor means for controlling engine throttle setting, (b) a pressure source means for supplying pressure to said servo motor means, (c) solenoid valve means for selectively imposing pressure from said pressure source on said servo motor means, (d) a modulating valve means for imposing atmospheric pressure on said servo motor means, and (e) a holding circuit means for maintaining said modulating valve means in atmospheric pressure supplying position when said first servo motor means is disabled.

18. A speed regulating system including (a) first servo motor means for controlling an engine throttle setting, (b) a pressure source means for supplying pressure to said servo motor means, (c) a solenoid valve means for alternately permitting and interrupting imposition of said pressure source on said servo motor means, (d) a modulating valve means for imposing atmospheric pressure on said servo motor means, (e) a modulating means for varying the rate of supply of said control pressure to said modulating valve means, (f) a brake switch means, and (g) a means for maintaining said modulating valve means in atmospheric pressure supplying position when said brake switch means is opened.

19. A speed regulating system including (a) first servo motor means for controlling an engine throttle setting, (b) a pressure source means for supplying pressure to said servo motor means, (c) a solenoid valve means for alternately permitting and interrupting imposition of said pressure source on said servo motor means, (d) a modulating valve means for imposing atmospheric pressure on said servo motor means, (e) a modulating means for varying the rate of supply of said control pressure to said modulating valve means, (f) an actuating circuit for said solenoid valve means, (g) a holding circuit means for said modulating valve means, (h) a holding circuit means for said solenoid valve means, (i) an actuating circuit means for said modulating means for varying the rate of supply of said control pressure to said modulating valve means, and (j) a resume circuit means for reactivating said solenoid valve means after deactivation thereof.

20. The combination set out in claim 19 including a supply circuit means and manually operated switch means between said supply solenoid circuit means and said other circuit means for disabling said holding circuit means for said solenoid valve means to place said solenoid valve in pressure interrupting position.

21. A circuit for a speed regulator system including (a) a vacuum solenoid actuating circuit for activating a vacuum supplying solenoid, (b) a solenoid holding circuit electrically connected to said vacuum actuating circuit, (c) a coupling coil circuit for monitoring a pressure flow downstream from said vacuum supplying solenoid, (d) a brake actuated switch in said solenoid holding circuit, (e) said brake actuated switch when opened placing said solenoid holding circuit in a non-conducting condition and thereby interrupting said circuit, and (f) a resume circuit means for reactivating said vacuum supplying solenoid whereby said speed regulator system again assumes and maintains a preselected speed.

22. A circuit for a speed regulator system including (a) a vacuum solenoid actuating circuit for activating a vacuum supplying solenoid, (b) an advance solenoid circuit electrically coupled to said vacuum solenoid actuating circuit, (c) a solenoid holding circuit electrically connected to said vacuum solenoid actuating circuit, (d) a coupling coil circuit, (e) said coupling coil circuit being placed in active current carrying condition by deactivation of said advance solenoid circuit, (f) resume circuit means for reactivating said vacuum supplying solenoid circuit after deactivation, (g) a one-way electrical passing means disposed in said solenoid holding circuit for preventing actuation of said advance solenoid circuit upon reactivation of said solenoid holding circuit, (h) said coupling coil circuit including a valve plate means, (i) a brake switch in said solenoid holding circuit, and (j) a one-way electrical passing means disposed between said coupling coil circuit and said solenoid holding circuit to prevent maintenance of said solenoid holding circuit after opening the said brake switch.

(References on following page)

References Cited

UNITED STATES PATENTS

| | | | |
|---|---|---|---|
| 3,195,672 | 7/1965 | Brennan | 123—103 X |
| 3,249,176 | 5/1966 | Dangler et al. | 123—103 X |
| 3,268,026 | 8/1966 | MacDuff et al. | 123—103 X |
| 3,298,482 | 1/1967 | Mueller et al. | 123—103 X |
| 3,305,042 | 2/1967 | Thorner | 180—106 |
| 3,368,640 | 2/1968 | Bremer et al. | 180—108 |
| 3,410,361 | 11/1968 | Marie | 180—108 |

KENNETH H. BETTS, Primary Examiner

U.S. Cl. X.R.

123—103; 180—106